(12) United States Patent
Swartz et al.

(10) Patent No.: US 11,673,320 B2
(45) Date of Patent: * Jun. 13, 2023

(54) THREE-DIMENSIONAL PRINTED COMPOSITES USING SODIUM SILICATE BINDER

(71) Applicant: Impossible Objects, Inc., Northbrook, IL (US)

(72) Inventors: Robert Swartz, Highland Park, IL (US); Eugene Gore, Des Plaines, IL (US); Buckley Crist, Wilmette, IL (US); Michael Vasquez, Chicago, IL (US); John Bayldon, Evanston, IL (US)

(73) Assignee: Impossible Objects, Inc., Northbrook, IL (US)

( * ) Notice: Subject to any disclaimer, the term of this patent is extended or adjusted under 35 U.S.C. 154(b) by 438 days.

This patent is subject to a terminal disclaimer.

(21) Appl. No.: 16/775,269

(22) Filed: Jan. 28, 2020

(65) Prior Publication Data

US 2020/0406532 A1    Dec. 31, 2020

Related U.S. Application Data

(60) Provisional application No. 62/797,898, filed on Jan. 28, 2019.

(51) Int. Cl.
*B29C 64/147* (2017.01)
*B33Y 10/00* (2015.01)
(Continued)

(52) U.S. Cl.
CPC .......... *B29C 64/147* (2017.08); *B29C 64/153* (2017.08); *B29C 64/165* (2017.08); *B29C 64/245* (2017.08); *B29C 64/295* (2017.08); *B32B 5/022* (2013.01); *B32B 5/024* (2013.01);

*B32B 5/26* (2013.01); *B33Y 10/00* (2014.12); *B33Y 70/10* (2020.01); *B33Y 80/00* (2014.12); *B29K 2023/06* (2013.01); *B29K 2023/12* (2013.01); *B29K 2025/06* (2013.01);
(Continued)

(58) Field of Classification Search
None
See application file for complete search history.

(56) References Cited

U.S. PATENT DOCUMENTS

| 9,833,949 B2 | 12/2017 | Swartz et al. |
| 2016/0082657 A1* | 3/2016 | Swartz ............... B32B 5/22 425/110 |
| 2018/0141305 A9 | 5/2018 | Swartz et al. |

FOREIGN PATENT DOCUMENTS

| WO | 2013079637 A1 | 6/2013 |
| WO | WO-2013079637 A1 * | 6/2013 ............ C08J 11/04 |

OTHER PUBLICATIONS

European Search Report; EP20748678; dated Sep. 19, 2022.

\* cited by examiner

*Primary Examiner* — Colin W. Slifka
(74) *Attorney, Agent, or Firm* — Dunlap Bennett & Ludwig, PLLC

(57) ABSTRACT

A three-dimensional object comprises stacked substrate layers infiltrated by a hardened material. Each substrate layer is a sheet-like structure that comprises fibers held together by a sodium silicate binder. The substrate layer material may be non-woven or woven. The substrate layer may be a non-woven fiber veil bound by a sodium silicate binder. The fibers may optionally include carbon fibers, ceramic fibers, polymer fibers, glass fibers, metal fibers, or a combination thereof.

19 Claims, 18 Drawing Sheets

(51) Int. Cl.
*B33Y 80/00* (2015.01)
*B29C 64/153* (2017.01)
*B33Y 70/10* (2020.01)
*B29C 64/245* (2017.01)
*B29C 64/295* (2017.01)
*B29C 64/165* (2017.01)
*B32B 5/02* (2006.01)
*B32B 5/26* (2006.01)
*B29K 101/10* (2006.01)
*B29K 105/00* (2006.01)
*B29K 707/04* (2006.01)
*B33Y 70/00* (2020.01)
*B29K 23/00* (2006.01)
*B29K 25/00* (2006.01)
*B29K 33/00* (2006.01)
*B29K 71/00* (2006.01)
*B29K 79/00* (2006.01)
*B29K 81/00* (2006.01)

(52) U.S. Cl.
CPC ...... *B29K 2033/12* (2013.01); *B29K 2071/00* (2013.01); *B29K 2079/085* (2013.01); *B29K 2081/04* (2013.01); *B29K 2101/10* (2013.01); *B29K 2105/0097* (2013.01); *B29K 2707/04* (2013.01); *B29K 2713/00* (2013.01); *B29K 2995/0094* (2013.01); *B32B 2260/023* (2013.01); *B32B 2260/046* (2013.01); *B32B 2264/10* (2013.01); *B33Y 70/00* (2014.12)

THREE-DIMENSIONAL PRINTED COMPOSITES USING SODIUM SILICATE BINDER

RELATED APPLICATIONS

This application claims the benefit of U.S. Provisional Application Ser. No. 62/797,898, filed Jan. 28, 2019, the entire disclosure of which is herein incorporated by reference.

FIELD OF THE TECHNOLOGY

The present invention relates to three-dimensional fabrication and, in particular to novel substrates for fabrication of three-dimensional objects.

BACKGROUND

Three-dimensional (3D) printing can be seen as largely a materials problem. The limitations of current methods include a limited materials palette and slow build speeds. What has therefore been needed are materials that facilitate methodologies and mechanisms for rapid construction of three-dimensional objects.

One of the earliest 3D printing processes, Selective Laser Sintering (SLS), uses small polymer particles as the input material for the process. The typical particle size used in this process is around 50 microns. A layer of powder is doctored or spread out over a powder bed and then selectively melted with a laser to form a layer of the 3D object being printed. The powders used in the SLS process are predominately produced by precipitation or grinding [see, e.g. U.S. Pat. No. 8,066,933]. These powders, which were previously used in powder coating, were selected for use because they were of the right size and came in polymer materials, such as, but not limited to, Polyamide 12 (PA12), which had good mechanical properties and thermal characteristics, including having a melting point that is sufficiently higher than its crystallization point. In particular, precipitated powders, such as those manufactured by Evonik, were preferred for SLS because their shape was regular and they could be produced with a narrow particle size range.

A similar approach is also used for newer processes, such as high speed sintering, which was developed by Neil Hopkinson and commercialized by Hewlett-Packard ("HP"). In the HP process, which they call HP Jet Fusion and Hopkinson calls High Speed Sintering, a layer of thermoplastic polymer powder is laid out onto a heated powder bed. The powder bed is heated to just below the melting point of the polymer powder The layer to be printed is printed with an ink jet head, using an ink containing carbon black, and then an infrared lamp is passed over the printed layer, heating the selectively deposited carbon black, which in turn sinters the polymer powder. This is repeated on a layer-by-layer basis for all of the layers of the object. The part is then cooled. As for laser sintering, the powder bed is heated to just below the melting point of the powder, so that the amount of energy that needs to be added is reduced. Limitations of the High Speed Sintering process and SLS include that the precipitated powders are expensive and that the precipitation process works for only a small number of polymers, which greatly limits the available materials.

A more recent approach to fabrication of 3D objects is the Composite-Based Additive Manufacturing (CBAM) process, described in detail in U.S. patent application Ser. No. 14/835,685, U.S. patent application Ser. No. 14/835,697, U.S. Pat. Nos. 9,833,949, 9,827,754, and 10,046,552, all of which are herein incorporated by reference in their entirety. The CBAM process as described in these patents also uses powders, many of which are based on the powders used for laser sintering and produced by the grinding or precipitation methods.

Electrophotography, or xerography, is a process that has had decades of development. It uses toner, which is typically a ground polymer powder that has carbon black or other pigments added. In recent years, the composition of toner has begun to switch from ground thermoplastic powders to emulsion aggregation [such as is taught in, for example, but not limited to, U.S. Pat. No. 7,0412,420] or chemically-produced toners. These newer materials have a number of advantages over ground or precipitated polymer particles. Since the particle is engineered, its shape and composition can be specifically designed for a particular intended purpose. The shape of the particle is therefore no longer determined or severely limited by the particle-creation process; instead, any number of different shapes can be produced. Additionally, the size of the particle can be more closely controlled. For example, in the case of emulsion aggregation, the particles are constructed from smaller particles. The particle size distribution can also be tailored, as can any number of other characteristics, such as the surface morphology and roughness of the particles. In addition, since the particles are engineered, they can alternatively, or additionally, be coated with waxes, have encapsulated internal materials, and/or be made up of multiple different materials.

SUMMARY

Various improvements are achieved in fabrication of three-dimensional (3D) objects, and in the 3D objects themselves, through the inclusion of materials that have not previously been employed in these processes. The invention includes both the use of these materials in the processes and objects produced using and including these materials. These materials may be advantageously employed in both the CBAM process and the various sintering processes known in the art, including, but not limited to, SLS, high speed sintering, and HP Multi Jet Fusion, as well as in many other 3D fabrication methods known in the art.

The size and shape of the powder particles employed in 3D object fabrication has been found to be relevant both to the efficiency and success of the process and to the quality of the object produced. In one aspect, the invention includes the use of engineered powders, such as, but not limited to, emulsion aggregation (EA) and chemically-produced toner (CPT) powders. These powders provide significant advantages over the powders that have previously been employed for fabrication of 3D objects, including improved control of particle size, control of particle surface morphology, improved powder flowability, control of particle surface energy, a larger selection of possible powder feedstocks, and production of non-homogenous particles comprising more than one material. Engineered powders according to this aspect of the invention may be advantageously employed in many 3D fabrication methods, including, but not limited to, the CBAM, SLS, high speed sintering, and HP Multi Jet Fusion processes. Substrates used with engineered powders according to this aspect of the invention may be non-woven, woven, or any of the many other suitable substrates known in the art.

In another aspect, the invention includes the use of sodium silicate binder in construction of the substrate sheets used in the CBAM process. Unlike prior art binders, substrate sheets having a sodium silicate binder do not suffer from burning at the high temperatures needed for some fabrication processes. Substrates employing a sodium silicate binder according to this aspect of the invention may be non-woven, woven, or any of the many other suitable substrates known in the art. In some particular implementations, the invention includes a nonwoven fiber veil having sodium silicate as a binder and a 3D object comprising fibers, polymer, and a sodium silicate binder.

In exemplary implementations of this invention employing the CBAM process, a 3D object is formed layer by layer. Powder, preferably an engineered powder, is selectively deposited on each layer. The powder is melted, so that it coats a portion of the substrate layer. The melted powder then solidifies, bonding layers of substrate together. The excess substrate, which is not coated by the solidified material, is subsequently removed. In a preferred embodiment, the substrate is carbon fiber and the excess substrate is removed by abrasion. The substrate may optionally comprise fibers with sodium silicate binder, and may preferably comprise carbon fibers with sodium silicate binder.

In one aspect, a three-dimensional article of manufacture according to the invention comprises a plurality of substrate layers that are infiltrated or coated by, and bound together by, a hardened material, such that the hardened material has a material composition that is different from the material composition of any of the plurality of substrate layers, wherein all of the plurality of substrate layers have a substantially identical material composition and each substrate layer is a sheet-like structure that has a material composition comprising fibers held together by a sodium silicate binder. In some embodiments, the substrate layer material includes carbon fibers, ceramic fibers, polymer fibers, glass fibers, metal fibers, or a combination thereof. The substrate material may be non-woven or woven. In a preferred embodiment, the substrate layer is a non-woven material and the binder includes sodium silicate. In some embodiments, the hardened material is formed by heating at least one engineered powder. The engineered powder may include at least one emulsion aggregation powder, at least one chemically-produced toner powder, or a combination. The hardened material may exhibit a set of one or more characteristics, which set is sufficient for distinguishing the hardened material as having formed as a result of the powder having been positioned on the substrate layers and then being at least partially softened followed by hardening.

In another aspect, a substrate according to the invention has a material composition comprising fibers held together by a sodium silicate binder. In some embodiments, the fibers may include carbon fibers, ceramic fibers, polymer fibers, glass fibers, metal fibers, or a combination thereof. The substrate material may be non-woven or woven. In a preferred embodiment, the substrate layer is a non-woven material and the binder includes sodium silicate. In some embodiments, the substrate is a layer comprising a sheet-like structure.

BRIEF DESCRIPTION OF THE DRAWINGS

Other aspects, advantages and novel features of the invention will become more apparent from the following detailed description of the invention when considered in conjunction with the accompanying drawings wherein:

FIGS. 7 to 11 depict an illustrative ring torus being fabricated according to a prototype of this invention, wherein:

FIG. 7 shows a pattern comprising a 4×3 matrix that has been inkjet-printed on a substrate layer, such that in each tile of the matrix, a different cross-sectional "slice" of the ring torus has been printed by the inkjet printer.

FIG. 8 shows a compressive device, after a number of substrate tile layers have been placed in it, one on top of the other, and then aligned by inserting two registration pins of the compressive device into the two registration holes of each tile.

FIG. 9 shows the compressive device of FIG. 8, after substrate layers with all of the "slices" of the ring torus have been inserted into it, with springs in the compressive device pressing the substrate layers together.

FIG. 10 shows the layers of substrate that have been fused together into a rectangular cuboid; and FIG. 11 shows a ring torus that remains after the excess substrate in the rectangular cuboid of FIG. 10 has been removed.

Figure 1A:
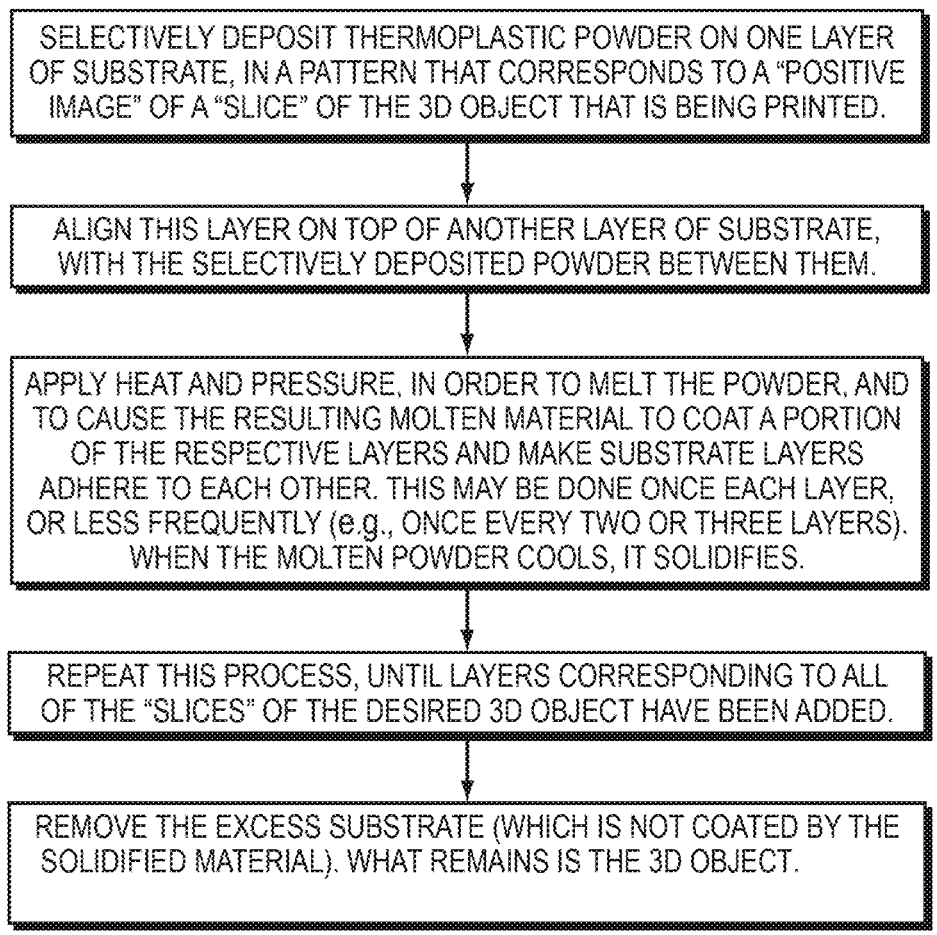
FIG. 1A is a high-level flow chart of steps used to manufacture a 3D object according to one implementation of the Composite-based Additive Manufacturing (CBAM) process, in an example embodiment of this invention.

The Drawings show all or part of illustrative embodiments of this invention, or of products of those embodiments. The Drawings do not show all of the possible details of the invention.

DETAILED DESCRIPTION

With the present invention, various improvements are achieved in the process of fabrication of three-dimensional (3D) objects, and in the 3D objects themselves, through the inclusion of materials that have not previously been employed in these processes. The invention includes the both the use of these materials in the processes, and objects produced using and including these materials. While the current disclosure describes in detail the use of these materials in the CBAM process to produce particular 3D objects, it will be clear to one of skill in the art of the invention that the same materials may also be advantageously employed in many other 3D fabrication methods to produce many other 3D objects without undue experimentation, including, but not limited to, sintering processes such as the SLS, high speed sintering, and HP Multi Jet Fusion processes. Substrates used with engineered powders according to this aspect of the invention may be non-woven, woven, or any of the many other suitable substrates known in the art.

Engineered powders, such as, but not limited to, emulsion aggregation (EA) and chemically-produced toner (CPT) powders, provide significant advantages over powders that have previously been employed for fabrication of 3D objects, such as those produced by precipitation or grinding. These advantages include, but are not limited to, improved control of particle size, control of particle surface morphology, improved powder flowability, control of particle surface energy, a larger selection of possible powder feedstocks, and production of non-homogenous particles comprising more than one material. The conversion cost of using these engineered powders is relatively inexpensive, so the costs of the polymers employed is much closer to the cost of the underlying resin.

The size and shape of the powder particles employed in 3D object fabrication has been found to be relevant both to the efficiency and success of the process and to the quality of the object produced. Since engineered powders, such as EA and CBT powders, may be custom designed to precise specifications, any number of different particle sizes and shapes can be produced, such as, but not limited to, spherical, oval, raspberry, or potato-shaped. By using engineered powders, the shape of the powder particles used for 3D fabrication is therefore no longer determined or severely limited by the particle-creation process, but instead can be precisely selected to enhance the efficiency and success of the fabrication process. In preferred embodiments, the engineered powder has particles ranging in size from 30 to 150 microns.

In particular, the flowability of the powder, i.e. characteristics relevant to the ability to control the rate and location of powder deposition, is important, as has been demonstrated in both the CBAM and SLS processes. For example, in the CBAM process, the ability of the powder to flow out of a trough is important. This ability has been found to relate to particle shape, flow agents, and powder load. In the present invention, these properties have been shown to be better controlled by using EA and CPT powders in both the CBAM and sintering processes, including, but not limited to, SLS, high speed sintering, and HP Multi Jet Fusion.

Additionally, with engineered powders, such as EA or CBT powders, the surface energy of the particle can also be controlled. This is of particular importance to the CBAM process. Bi-modal and other non-Gaussian particle distributions may also be produced, which can have positive effects on the CBAM end product. Surface treatments and/or additives which may be used to control powder flow and charge distribution include, but are not limited to, silica, titania, alumina (both treated and untreated), metal steatites, micronized PMMA, tungsten oxide, particulate fluoropolymers, magnetite, cerium oxide, carbon black, inorganic salts of fatty acids, such as, but not limited to, aluminum, calcium, or zinc stearate, and other such treatments that are well known in the art.

Furthermore, with engineered particles, each particle is not limited to comprising a homogenous material. For example, the surface layer of the particle can be made from a different material than the interior, or the particle may be coated with wax. When the particle is an aggregation of multiple particles, then both the particle size and composition can be varied. The particle can therefore be engineered for any specific application.

In addition, engineered powders can be produced from a larger number of feedstocks than previously-employed conventional powder particles, which have been limited to materials that are amenable to precipitation and/or grinding. As a result, the polymer selection for the powder is greatly increased. In particular, powders can engineered from what would previously have been "difficult" polymers, such as, but not limited to, elastomers, polyolefins, and more refractory materials, such as, but not limited to, Polyether Ether Ketone (PEEK), Polyaryletherketone (PAEK), and Polyetherimide (PEI). For example, ground PEEK particles are generally shattered and have rough surface morphology and complex shapes. These are problems that can be solved by producing PEEK particles according to one of the engineered powder methodologies. Similar advantages may be obtained with engineered powders created from any of the other types of materials suitable for use in 3D object fabrication processes.

An additional materials problem encountered when employing the CBAM process is related to the binder that is part of the substrate sheets. The fiber veils that are used as substrates in some preferred embodiments of the CBAM process have a binder in them. This binder is used to give the fabric wet strength during the manufacturing process and is often polyester. For example, when making PEEK parts, this binder burns, since, at the melting point of PEEK (343° Celsius), the polyester combusts or, in an inert atmosphere, breaks down. In turn, this can cause the carbon fiber to burn. The burning can be substantially reduced by compressing the sheets, which removes the oxygen, or by heating in an inert atmosphere. However, even in this instance, the polyester either burns or is broken down by the heat. When this happens, the breakdown products produce an acrid odor, which is undesirable. Similar problems occur when using other materials with high melting points, such as, but not limited to, PAEK and PEI. Significantly, a binder which either does not burn or is low-burning and flame retardant is required in a number of applications, such as in products for the aircraft and aerospace industries. Thus, non-burning binders are a long-felt need in 3D object fabrication.

There are a number of ways to ameliorate this problem. In one method, a starch or polyvinyl alcohol binder is used. In this method, the odor is controlled, but the problem of burning still remains. In another method, the heating is performed in an inert vacuum or nitrogen atmosphere. In this instance, a fume extractor is needed to remove the fumes. This eliminates the combustion, but not the breakdown of the polyester or other binder.

In one aspect of the present invention, a preferred solution to these problems is to use sodium silicate as a binder. Sodium silicate, also known as "water glass", is a water-soluble glass that dries into a glassy material. Sodium silicate has the advantages that it does not break down at the melting temperature of PEEK, PAEK, PEI, or other materials with a high melting point that are used for 3D object fabrication, and also that it will not burn. It is therefore better suited for applications that require fire retardant properties. Sodium silicate is also an adhesive, so it imparts wet strength to the nonwoven veil. Additionally, is very inexpensive. Sodium silicate binders therefore provide significant advantages over previous binders.

Substrates employing a sodium silicate binder according to this aspect of the invention may be non-woven, woven, or any of the many other suitable substrates known in the art. In some preferred embodiments, the invention includes a nonwoven fiber veil having sodium silicate as a binder. In other preferred embodiments, the invention includes a 3D object comprising fibers, powder, and a sodium silicate binder. It will be clear to one of skill in the art that the substrate materials used in the fiber veil can include any of the many fibers known in the art including, but not limited to, carbon, fiberglass, polymers, ceramics, and metals, and that the powders may include any of the many suitable powders known in the art including, but not limited to, thermoplastics, thermosettable powders, polymers, and nylon, and may be engineered powders according to another aspect of the invention or powders created by other means, including, but not limited to, grinding or precipitation.

In certain example implementations of this invention which employ the CBAM process, a 3D object is formed layer by layer. Powder is selectively deposited on each layer. The powder may preferably comprise engineered powders, such as EA or CBT powders. The powder is melted, so that it coats a portion of the substrate layer. The melted powder then solidifies, bonding layers of substrate together. The excess substrate, which is the substrate not coated by the solidified material, is subsequently removed. In a preferred embodiment, the substrate is layers of carbon fiber sheets and the excess substrate is removed by abrasion. The substrate may optionally comprise fibers with sodium silicate binder, and may preferably comprise carbon fibers with sodium silicate binder.

Figure 1B:
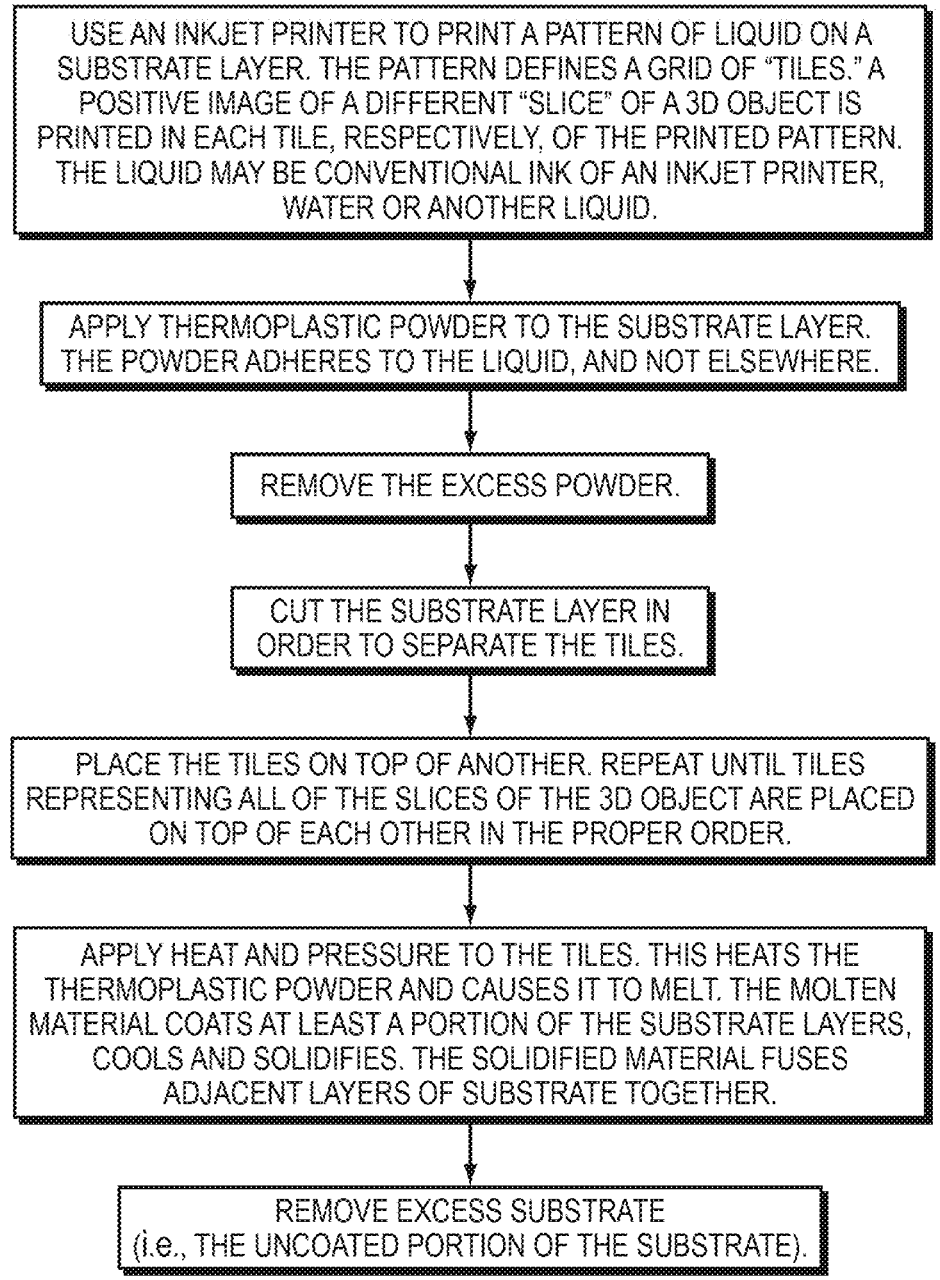
FIG. 1B is a high-level flow chart of steps used to manufacture a 3D object according to an alternative implementation of the Composite-based Additive Manufacturing (CBAM) process, in another example embodiment of this invention.

FIGS. 1A and 1B are each flow charts of steps used to manufacture a 3D object according to the CBAM process, in two illustrative embodiments of methods according this invention. In preferred implementations of the methods of FIGS. 1A and 1B, the powder is an engineered powder and the substrate layers comprise carbon fiber sheets with sodium silicate binder.

A preferred implementation of an apparatus for carrying out the CBAM process is described in U.S. Pat. No. 10,046,552, which is herein incorporated by reference in its entirety. In the example apparatus of U.S. Pat. No. 10,046,552, the main components include a material feeder, a printer, a powder system comprising a powder applicator and powder remover, an optional fuser, a transfer system, and other elements that serve to connect and control the various components.

In illustrative implementations of this invention employing the CBAM process, the 3D object is printed in accordance with a computer 3D model of the object, created by a CAD program. For example, the CAD program may be a free-form NURBS (non-uniform rational basis spline) program, such as Rhinoceros® (available from McNeel North America, Seattle, Wash.). Or, for example, the CAD program may be SolidWorks® (available from Dassault Systèmes SolidWorks Corp., Concord, Mass.).

On each substrate layer, powder is selectively deposited in a physical pattern that corresponds to a "positive image" of a thin slice or section of the 3D object. That is, for each slice of the 3D object: (a) powder is deposited in positions that correspond to positions in the slice where the 3D object exists, and (b) powder is not deposited in positions that correspond to positions in the slice where the 3D object does not exist. Thin slices of the 3D CAD model may be created, for example, by starting with a 3D model in STL file format and using the Slice Commander feature of Netfabb® Studio software (available from Autodesk) to create the thin slices.

Thermoplastic or Thermosettable Powder

In preferred embodiments, the powder used will be an engineered powder. In some implementations, the powder particles will be produced using EA or CPT methods. In example implementations, a thermoplastic powder is used. For example, the powder may be Shaetti® SF 400 or Shaetti® Fix 1820 thermoplastic powder (available from Shaetti America, Inc., Mooresville, N.C.), any of the similar powders available from suppliers such as Evonik, Solvay, and Arkema, or any other powder known in the art that melts, flows, and bonds under heat. The thermoplastic powder may comprise a polyethylene or other polyolefin. Advantageously, polyethylene may have a lower melting point than the substrate, and may be impervious to many solvents, acids and other chemicals that degrade plastics, thus not being affected if such chemicals were used to remove excess substrate. Alternatively, a thermosettable powder that melts and flows sufficiently to coat the substrate may be used.

Selective Deposition of Powder Step

According to principles of this invention, the powder may be selectively deposited on substrate layers in many different ways, including, but not limited to, those ways described in Examples 1-4 below. While specific illustrative examples of powder deposition are set forth herein, this invention is not limited to the examples of selective deposition described. It will be clear to one of skill in the art that other methods of powder deposition are suitable for use with the engineered powders of the present invention in order to fabricate 3D objects.

Selective Deposition of Powder—Example 1

In a first illustrative method of powder deposition, powder may be selectively deposited on a substrate layer by making the powder adhere to a liquid. In this method, a liquid is selectively deposited on a substrate layer, so that some parts of the substrate layer are covered with liquid and some are not. Then, the side of the substrate layer on which the fluid was deposited is flooded with powder (e.g., the powder is deposited on this side of the substrate layer). The powder adheres to the liquid. The excess powder (i.e., the powder that is not adhering to the liquid) is then removed. For example, the excess powder may be removed by vacuuming and/or by means of an air knife. Alternatively, the substrate may be flipped over so that the excess powder falls off, or the substrate may be turned upside down and flicked or shaken. Many other means of excess powder removal will occur to one of skill in the art and may be advantageously used in the invention. The substrate may also optionally be vibrated while the excess powder is removed, in order to facilitate the removal.

In some cases, the liquid that is selectively deposited is water or an aqueous solution that includes a material that slows the evaporation of water. For example, the material may be 2-pyrrolidinone. In other cases, it is a different liquid, such as an alcohol. For example, if the substrate is water sensitive (e.g. if the substrate is polyvinyl alcohol, PVOH), then water may distort or dissolve the substrate. In that case, an alcohol may be used as the liquid that is selectively deposited. In other embodiments, a glycol, such as, but not limited to, ethylene glycol, is added to the liquid.

In some cases, in order to prevent the liquid that is selectively deposited from spreading or being excessively absorbed into the substrate, it is helpful to apply a surface energy modifier to the substrate before selectively depositing the liquid. For example, Scotchguard® Fabric & Upholstery Protector (available from 3M, St. Paul, Minn.) may be sprayed or deposited on the substrate layer for this purpose. Alternatively, many of the other repellents or surface energy modifiers known in the art can be used.

In this example, a variety of methods may be used to dispense the liquid. For example, a thermal inkjet head or a piezoelectric inkjet head may be used to dispense the liquid. In one implementation, the inkjet head may comprise a HP45 cartridge, HP C 6602A cartridge, or HP51604A cartridge (available from Hewlett Packard Corp.) or a Lexmark® 50 cartridge or Lexmark 60 cartridge. Alternately, air pressure may be used to dispense the liquid (e.g., through a 0.005 inch nozzle obtained from the Lee Company, Essex, Conn., part INZA650935K). If air pressure is used, the release of air or dispensing of liquid may be controlled by a solenoid valve.

Selective Deposition of Powder—Example 2

In a second illustrative method of powder deposition, the powder may be selectively deposited by flooding one side of a layer of substrate with powder and then selectively heating the opposite side of the substrate with an appropriate device, such as, but not limited to, a thermal print head. In one implementation, a thermal print head from Mitani Micronics Co., Ltd., Tokyo, Japan may be used. In this approach, the thermal print head includes a high-resolution array of heating elements, which may be selectively turned on or off. In the areas that are heated, the powder melts and adheres to the substrate. The excess powder that has not adhered is removed. Again, this may be done by vacuuming the excess powder, or by simply flipping the substrate layer over, or by any of the many other means known in the art. Vibration may optionally be used to facilitate the removal of the powder. The thickness of the deposited powder can be controlled in this example by doctoring the precise thickness of powder on the substrate.

Selective Deposition of Powder—Example 3

In a third illustrative method of powder deposition, powder may be deposited using a selective deposition technique similar to that employed in xerographic printing. In this approach, an electrical charge is imparted to powder particles, which are directed toward the substrate layer and then selectively adhere to some portions of the substrate but not others, due to electrostatic attraction or repulsion. The powder particles adhere to portions of the substrate that have an opposite electrical charge, or that are adjacent to a surface that has such a charge, and are repelled from portions of the substrate that have the same electrical charge, or that are adjacent to a surface that has such a charge.

Selective Deposition of Powder—Example 4

In a fourth illustrative method of powder deposition, the powder may be deposited using a selective deposition technique similar to that employed in magnetographic printing. In this approach, powder selectively adheres to some portions of the substrate layer, but not others, due to magnetostatic interactions between the powder and the substrate layer or a surface adjacent to the substrate layer. For example, the powder may be a single component magnetic toner, may comprise a colloidal suspension (e.g., a ferrofluid), or may be a dual component toner. A variety of magnetic pigments, such as, but not limited to, magnetite ($Fe_3O_4$) or ferric oxide (($Fe_2O_3$), may be used for the toner in this approach.

In all of the above examples, the step of selectively depositing powder may include a substep of directing solid powder toward the substrate layer in a non-selective manner. For example, this substep may comprise flooding the entire layer of substrate with powder. Alternatively, in the xerographic or magnetographic examples (Examples 3 and 4), this substep may comprise sending electrically charged or magnetized powder toward the entire substrate layer.

Optionally, the powder system can be configured so that substrate sheets go through the powder application and powder removal stages more than one time. An advantage of this is that depositing powder onto a substrate sheet in multiple trips can increase the amount of powder that adheres to the printed areas of the substrate sheet, which sometimes is desirable for making the 3D part.

In the specific implementation described in U.S. Pat. No. 10,046,552, after the substrate sheet completes transit through the powder system, the conveyors may be reversed so that the sheet travels back to the entrance of the powder applicator and then reversed again (now going forward) so that the sheet goes back through the powder system again. In this embodiment, during travel in the reverse direction, one or both of the powder applicator and powder vacuum could be turned off. In an alternative embodiment, after a sheet exits the powder remover, a separate conveyor or transfer system can carry the sheet back to the conveyor associated with the entrance to the powder applicator, whereupon the sheet will travel back through the powder system. In these embodiments, the sheet may be flipped using any suitable mechanism known in the art, so that powder is applied the other side of the sheet. These steps can be repeated as many times as desired.

In example implementations, liquid is selectively dispensed in a 2D pattern that corresponds to the slice that it is being printed for the particular substrate layer. After the liquid is dispensed on that substrate layer, the top of the substrate layer is then flooded with thermoplastic powder. The powder adheres to the liquid, but does not adhere to the portions of the substrate layer that are not covered with the liquid. The excess powder is then removed. As previously described, this may be done, for example, but not limited to, by vacuuming the excess powder off, by using an air knife, or by flipping over the substrate layer.

Layer Fusing Step

In example implementations of this invention, pressure and heat are applied to the layers of substrate being fused after powder deposition, in order to melt the powder and to press the layers together. The pressure may additionally tend to force the melted thermoplastic to coat the substrate. In one example, a heated press may be used to apply heat and pressure. In another example, the substrate may be placed in a heated oven, while pressure is applied with a clamp or other compressive device. A tacking iron may optionally be used to tack the substrate layers together before inserting them into the oven. In both cases, once the powder melts, the pressure may tend to force the molten material to coat the substrate layers.

In many implementations, the powder is caused to melt after it has been selectively deposited: i.e., the melting occurs after the excess powder has been removed. However, if a thermal print head (with an array of heating elements) is used, then the melting is part of the process of selective deposition. The print head selectively heats portions of a substrate layer that has been flooded with powder, on the side of the substrate layer opposite from the print head, so that, in the heated areas, the powder melts and adheres to the substrate. Excess powder is removed. Heat and pressure are then applied, causing the adhered material to melt, or to remain molten, and to coat part of the substrate.

After the sheet has had powder applied and excess powder has been removed, it can also be advantageous to deliberately melt the remaining powder on the sheet (i.e., the powder adhered to the printed areas of the sheet) so that the powder more permanently affixes to the sheet and is thus protected from displacement, disruption, or falling off during subsequent processing steps. In the specific implementation described in U.S. Pat. No. 10,046,552, an optional fuser component may be disposed after the powder system. The fuser may be disposed above, below, or adjacent to the conveyor leading out of the powder remover. The fuser may be, for example but not limited to, radiant, IR, or other heating method sufficient to melt and thus fix the powder to the sheet. As the sheet travels out of the powder applicator, the heat from the fuser melts the powder on the substrate sheet causing it to fix to the sheet.

In all implementations, after the layer fusing step, the molten material then cools and solidifies into a solid that coats a portion of the substrate layer and also holds multiple substrate layers together. For example, if the substrate is fibrous, the molten material may coat these fibers. When the material solidifies, it continues to coat these fibers.

How frequently the powder is melted and the pressure is applied, may vary. In some implementations, these steps occur once for each layer. In other implementations, at least some of these steps occur less frequently. For example, heat and pressure may be applied only once for every two layers of substrate, or once for every five layers of substrate, etc.

Removal of Excess Substrate

Generally, a portion of the substrate will not be coated, because the powder was not present and melted in that area. The excess substrate is preferably removed. In some implementations, the removal of the excess substrate occurs just once, at the end of the process. Alternatively, the removal of the excess substrate may occur more than once during the process.

A variety of removal techniques may be employed. In some embodiments, excess substrate is removed by one or more of dissolution, polymer degradation, mechanical abrasion, or melting. If dissolution or degradation is employed to remove excess substrate, the dissolution or degradation may be accelerated by agitating and/or heating the agent used for dissolution and/or degradation. As non-limiting examples, any of the following may be agitated or heated to speed the dissolution or degradation: (a) sodium hydroxide or other alkali in aqueous solution or in an alcohol (e.g., ethanol or methanol), (b) potassium hydroxide in an alcohol (e.g., methanol or in ethanol), (c) water, and (d) hydrochloric acid in aqueous solution. Agitation may be achieved by, for example, but not limited to, ultrasound, a magnetic or paddle stirrer, shaking, or jets of liquid. If mechanical abrasion is used, then it is advantageous to use a substrate material that can be easily removed by abrasion when not coated. The object may optionally be placed in a mechanical tumbler to facilitate abrasion. This invention is not limited, however, to the methods of removing excess substrate listed above. Any other removal approach known in the art that relies on a difference between the material properties of the uncoated substrate and the solidified thermoplastic, causing the former to be more susceptible than the latter to the removal agent, may be advantageously employed in the invention.

Depending on the particular implementation of this invention, different types of substrates may be used, and, correspondingly, different materials may be used to dissolve or degrade excess substrate. Table 1 is a non-exhaustive list of some materials that may be used as the substrate and corresponding solvent or material for degradation. It will be clear to one of skill in the art of the invention, however, that this invention is not limited to the substrate materials, solvents, or degrading agents listed in Table 1, but may also be implemented with other substrate materials, solvents, and degrading agents.

TABLE 1

Example Substrates and Removal Agents

| Substrate | Material used for removal of excess substrate (e.g., by dissolution or degradation) |
|---|---|
| Polyethylene terephthalate (PET) | mixture comprising either: (1) alcohol and alkali (e.g., Everclear ® grain alcohol and sodium hydroxide) (the alcohol may comprise ethanol or methanol); or (2) methanol and potassium hydroxide. |
| polylactic acid (PLA) | (1) sodium hydroxide (in aqueous solution), or (2) potassium hydroxide (in methanol or ethanol) (3) Strip-X ® Stripper*(available from W. M. Barr & Co., Memphis, TN; contains acetone, methanol, methylene chloride, toluene, and xylene) |
| polyvinyl alcohol (PVOH) | water |
| polyamide (nylon) | hydrochloric acid |
| water soluble paper | water |
| paper | hydrochloric acid, or enzymes |
| silk | hydrochloric acid |
| fiberglass | hydrofluoric acid |
| carbon fiber, fiberglass, ceramics | abrasion |

In some implementations, the substrate comprises a woven material. Alternatively, the substrate may comprise a non-woven textile. For example, non-woven PVOH (available from Freudenberg USA) may be used as a substrate. Also, for example, the non-woven substrate may comprise HV 7841, HV 7801 or HV CTR2863A polyester, each available from Hollingsworth and Vose (East Walpole, Mass.), or may comprise A0514WHT polyester, available from Freundenberg. Or, for example, the substrate may comprise paper or another cellulose-based or plant fiber-based material. In preferred embodiments, the substrate comprises carbon fibers with a sodium silicate binder.

As noted in Table 1, water-soluble paper may be used for the substrate. For example, the water soluble paper may be of the type described in U.S. Pat. No. 3,431,166, in which paper is reacted with alkali during manufacture. Or, for example, the paper may employ polyvinyl alcohol (PVOH) which is used to bind paper fibers together. The former type of water soluble paper may be obtained from Aquasol Corporation (North Tonawanda, N.Y.) and the latter type may be obtained from Hollingsworth and Vose Company (East Walpole, Mass.). A problem with water-soluble paper is that it tends to swell when exposed to water. This swelling may be reduced by using a high pressure water jet, which tends to rapidly remove the paper that has been exposed to water, before the water can migrate into paper that has been partially coated with melted powder.

Alternatively, if ordinary paper (that is not water-soluble) is used as the substrate, then excess paper may be removed by enzymes that digest paper. For example, in a working prototype of this invention, the enzyme complex Accellerase® 1500 from Genencor (a division of Danisco USA, Inc., Tarrytown, N.Y.) was used for that purpose. An advantage of this approach is that it lessens or avoids the swelling associated with simply dissolving some types of water-soluble paper.

Different substances may be applied to or incorporated in the substrate layers in order to modify the absorption characteristics or surface energy of the substrate. For example, the substrate's absorption characteristics may be modified in this way with respect to a variety of liquids, such as melted powder, or liquid solvent or degrading agent, or a liquid that is dispensed for the powder to adhere to. In some implementations, a sizing material that acts as a filter or a glaze may be used for this purpose. The use of Scotchguard® Fabric & Upholstery Protector (available from 3M, St. Paul, Minn.) or other repellents is an example of applying a substance that changes the absorption characteristics and surface energy of the substrate layer.

Registration

In exemplary implementations of this invention, a registration mechanism is employed to cause the layers of substrate to be aligned during the 3D printing process. For example, guide posts in a registration form may be inserted into guide holes in the substrate layers. Alternatively, a corner of each substrate layer may be pushed into a guide corner, in order to align the layer with other layers. In another alternative, a light sensor or camera may be employed to determine whether substrate layers are aligned. This invention is not limited to the registration techniques described above, but may employ any type of registration to align the substrate layers, as will be apparent and well-known to one of ordinary skill in the art of the invention.

In some embodiments, such as the specific implementation described in U.S. Pat. No. 10,046,552, the printer may also optionally include one or more punches, so that, during or immediately prior to or after the printing operation, holes can be punched in the substrate sheet in desired locations. The holes are used later in the process to align the substrate sheets by loading them onto registration or alignment pins. Those pins can be part of a stacker subsystem, or part of a subsequent stacking operation, or both. In either case, preferably, the diameter of the holes is similar to the outer diameter of the registration pins to get the best registration. The punch can be, for example, a hole punch, a paper drill, or any other suitable mechanism known in the art. The punch can optionally include a mechanism for vacuuming the chads that are punched from the substrate sheets, or a separate vacuum, sweeping, or blowing mechanism can optionally be provided. The locations for the holes on the substrate sheet are defined in relationship to where the layer shapes for the 3D part will be printed on the substrate sheet. The information about the hole locations is provided to the printer along with the layer shape information. The computer for the printer can generate signals to cause holes to be punched at the desired locations.

If the system does not include a punch or other mechanism for forming holes in the substrate sheets, then holes can optionally be created in the sheets as a precursor or post processing step. Alternatively the corners of the sheet can be used for registration. The layer can also be die cut using a die cutting station that is well known in the art and this can be done before or after printing and should in register with the printing. There are also a number of other ways of making holes that are well known in the art, such as, but not limited to, laser cutting.

Substrate Layers

Figure 2A:
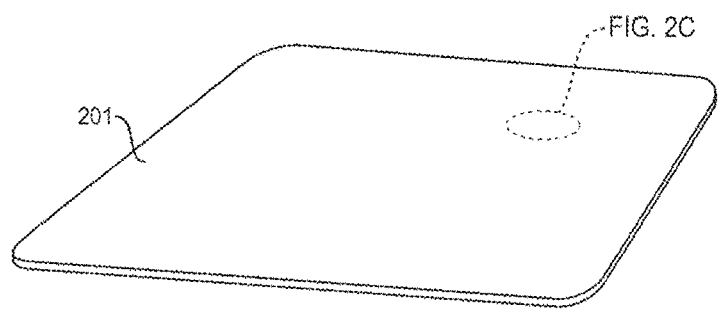
FIG. 2A shows an example substrate layer useable in the present invention.
Figure 2C:
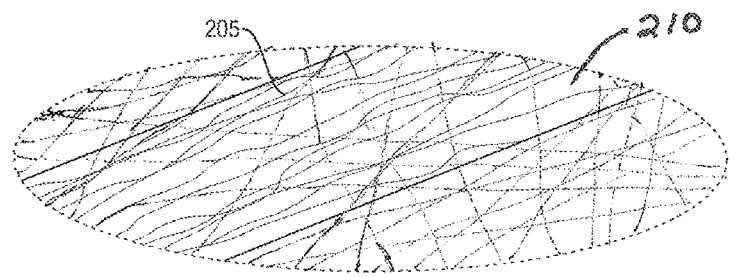
FIG. 2C is a representation of the micrograph of FIG. 2B, showing the fibers joined by the binder into the substrate.
Figure 2B:
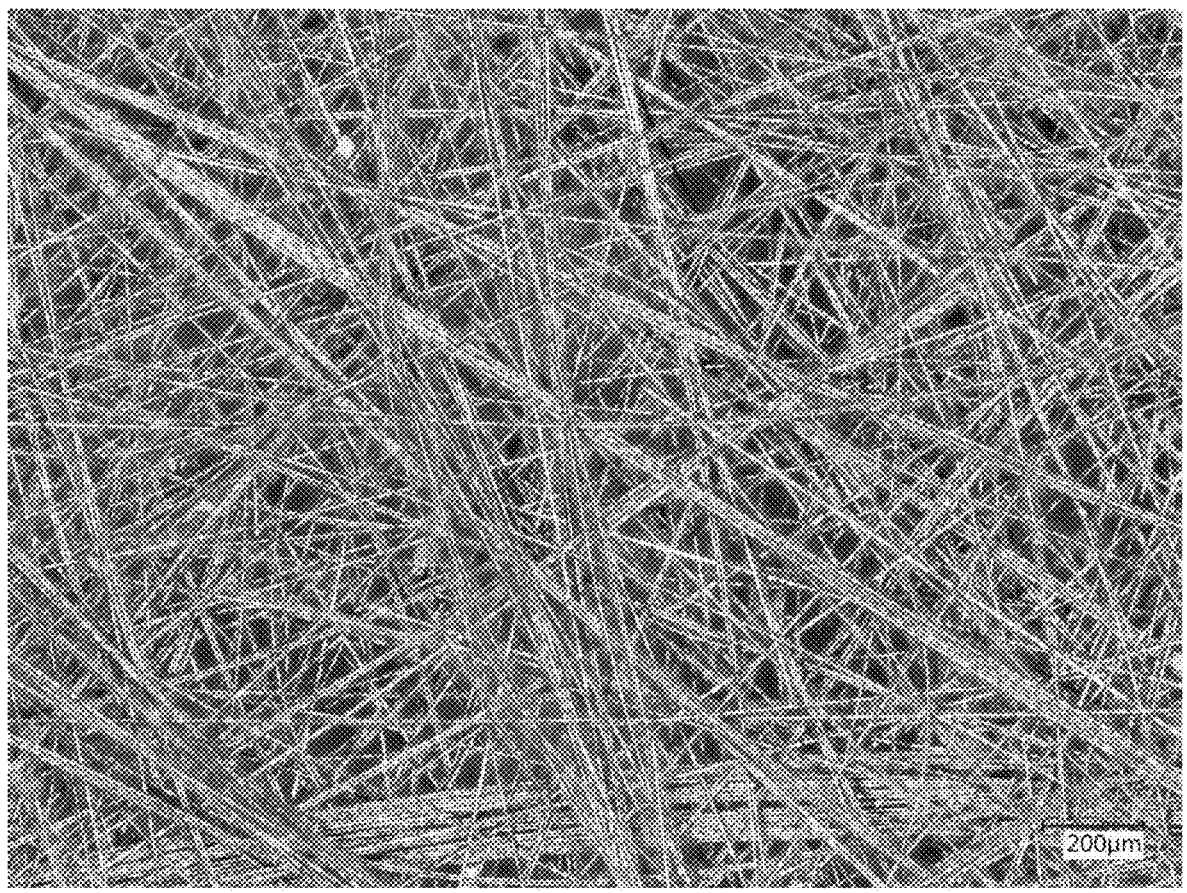
FIG. 2B is a photomicrograph of an example substrate layer according to FIG. 2A, showing individual fibers in the substrate layer.

FIG. 2A shows a substrate layer 201, in an illustrative implementation of this invention. FIG. 2B is a photomicrograph of a substrate layer such as that in FIG. 2A, showing individual fibers in the substrate layer. FIG. 2C is a representation of the micrograph of FIG. 2B, showing the fibers 205 joined by the binder 210 into the substrate layer 201.

In the example shown in FIGS. 2A, 2B and 2C, the substrate is nonwoven and fibrous. However, woven, fibrous substrates may also be used. In a preferred embodiment, the substrate may comprise a composite, nonwoven material that includes threads, short fibers, long fibers, or whiskers. Alternately, the substrate may comprise spherical particles, ellipsoidal particles, flakes, small platelets or small ribbons (or particulates of any other shape) which are joined together by a glue or other binding material. In a preferred embodiment, the fibers are carbon fibers and the binder is sodium silicate.

Figure 2D:
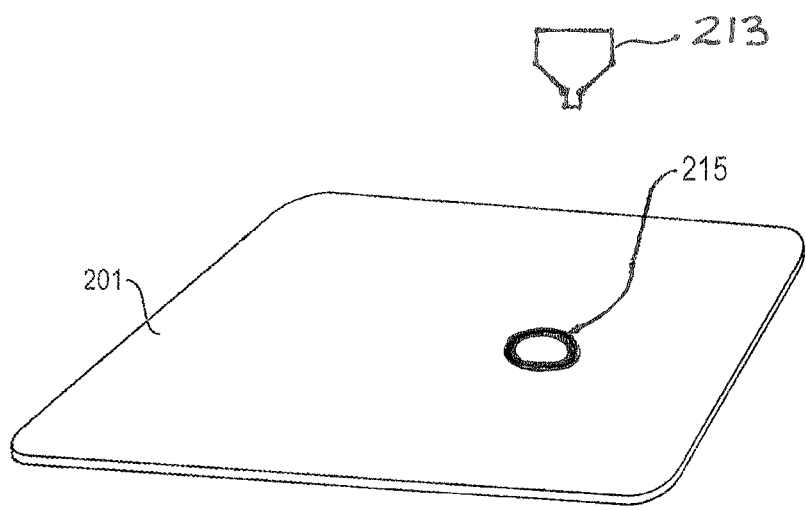
FIG. 2D depicts the example substrate layer of FIGS. 2A-C with a deposited ring of liquid.

FIG. 2D shows substrate layer 201, after an applicator 213 has selectively deposited a circular ring of liquid 215 on the layer. The deposited liquid 215 corresponds to a cross-sectional slice of the target 3D object, which, in this example, is a circular vase. For example, the substrate layer 201 may comprise carbon fiber, and the liquid 215 may comprise a thermosetting polymer resin mixture or thermoplastic polymer liquid.

Figure 2E:
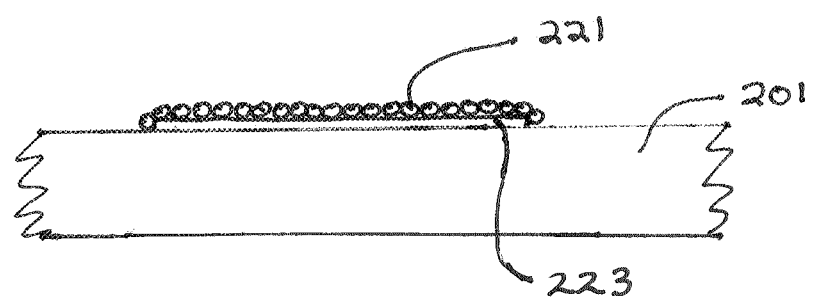
FIG. 2E is a cross-sectional view of the exemplary substrate layer of FIGS. 2A-C, showing powder adhering to liquid that has been selectively deposited on the substrate.

Alternately, the liquid employed may be any liquid suitable for deposition by an applicator, e.g., by an inkjet head. For example, in those cases where a thermoplastic powder is used, liquid may be selectively applied by an inkjet head to the substrate layer in a desired pattern, and then powder may be flooded onto the substrate, and adhere to the liquid in the desired pattern. FIG. 2E illustrates this example. FIG. 2E is a cross-sectional view of substrate 201 of FIGS. 2A-C, showing powder 221 adhering to liquid 223 that has been selectively deposited on substrate 201. In a preferred embodiment, substrate 201 is a carbon fiber layer and powder 221 is an EA or CBT powder.

Figure 3:
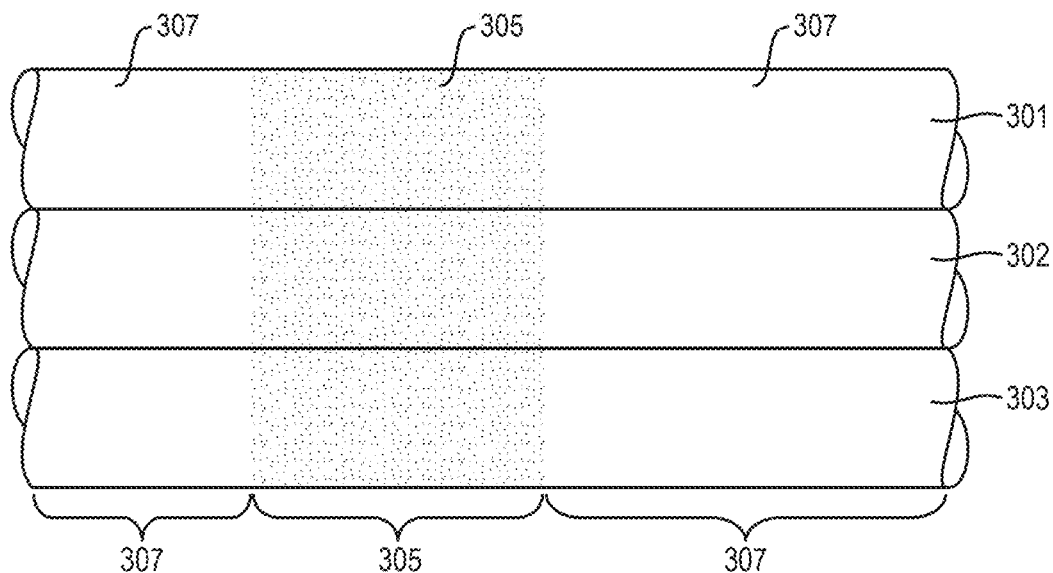
FIG. 3 is a cross-sectional view of multiple substrate layers bound together by solidified thermoplastic, after thermoplastic powder has melted, coated a portion of the substrate layers, and cooled.

FIG. 3 is a cross-sectional view of three substrate layers 301, 302, 303, after thermoplastic powder has melted, coated a portion of the substrate layers, cooled and solidified, in an illustrative embodiment of this invention. A portion 305 of these substrate layers is coated by the solidified thermoplastic. Another portion 307 of these substrate layers is not coated by the solidified thermoplastic. The details of the coating may vary, depending on the implementation. For example, the solidified thermoplastic may coat, infiltrate, penetrate or encapsulate a portion of the substrate layer, or substructures in a portion of the substrate layer, such as threads, short fibers, long fibers, whiskers, spherical particles, ellipsoidal particles, flakes, small platelets, small ribbons, or particulates of any other shape. The thickness of the coating may vary, depending on the implementation. Likewise, the way in which the solidified thermoplastic connects or bridges between substrate layers may vary, depending on the implementation.

Figure 4:
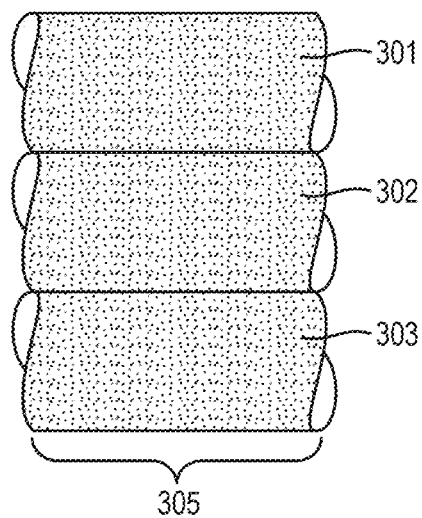
FIG. 4 is a cross-sectional view of the multiple substrate layers of FIG. 3, after excess substrate has been removed.

FIG. 4 is a cross-sectional view of the same three substrate layers, after excess substrate 307 (FIG. 3) has been removed. FIG. 4 shows these three substrate layers after removal of the portion of the substrate that is not coated by the solidified thermoplastic.

Rastering

Figure 5:
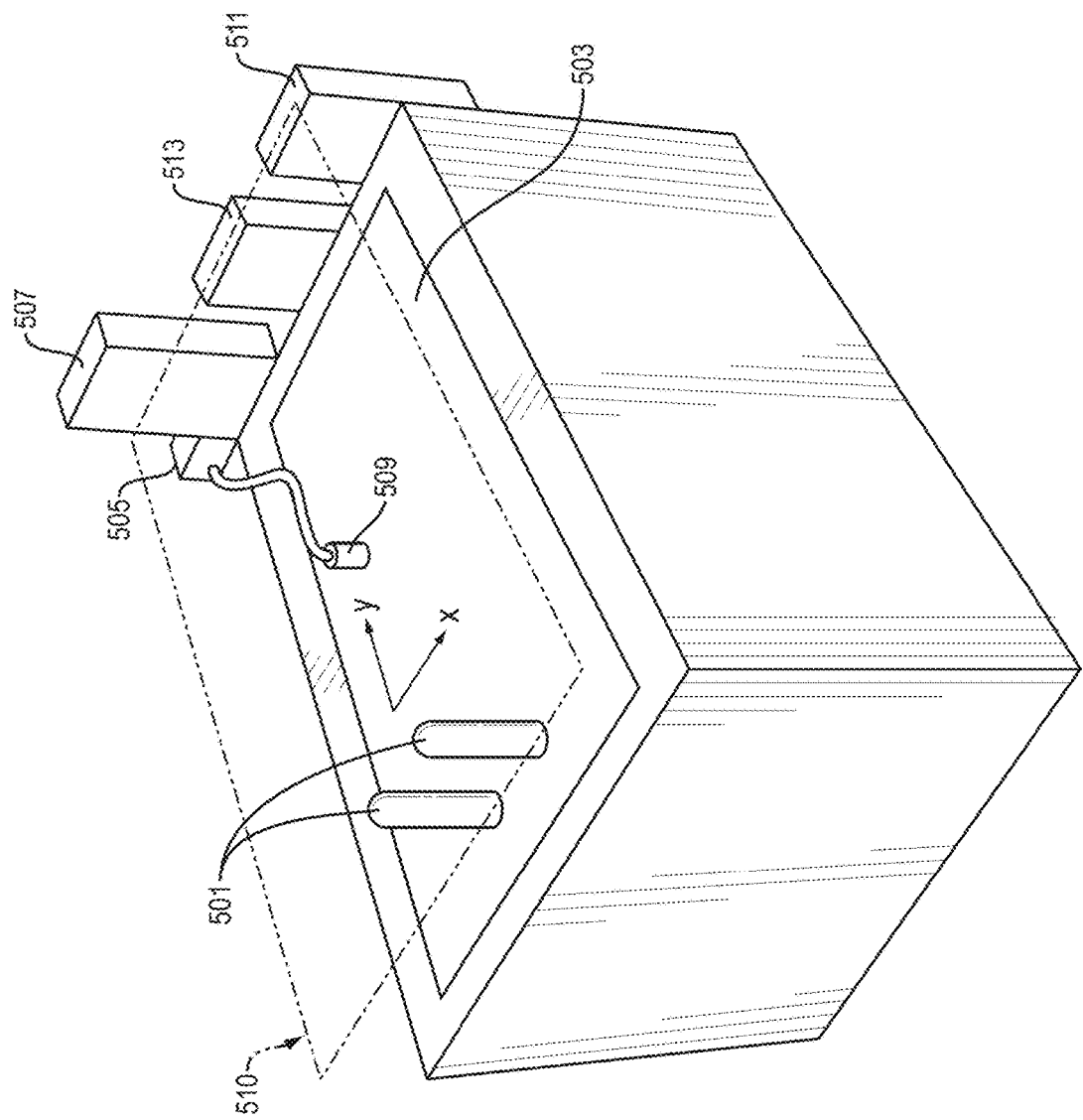
FIG. 5 shows apparatus used to selectively deposit liquid, to which powder adheres, in an illustrative implementation of this invention.

FIG. 5 shows apparatus used to selectively deposit liquid to which powder adheres, in an illustrative implementation of this invention. Registration guide posts 501 are inserted through a substrate layer 503 in order to properly align the substrate layer 503. A solenoid valve 505 is used to selectively dispense liquid from a liquid reservoir 507 though a nozzle 509 unto the substrate layer 503. The nozzle 509 is rastered in a 2D plane 510 that is parallel to, and above, the substrate layer 503, so that the liquid is selectively deposited at desired x, y coordinates of the substrate layer 503, and not deposited in other areas of the substrate layer 503. To achieve this rastering, a stepper motor 511 actuates two belts (not shown) that causes a support member (not shown) to move along two rails (not shown) in a direction parallel to the x-axis. A second stepper motor (not shown) and third belt (not shown) are mounted on the support member, and are used to move a nozzle support (not shown) in a direction parallel to the y-axis. The nozzle 509 is attached to the nozzle support. Together, the two stepper motors can move the nozzle 509 to any desired x, y coordinate above the substrate layer. A microprocessor 513 controls the stepper motors and the solenoid valve, thereby controlling when and where liquid is dispensed on the substrate layer 503.

Alternatively, rather than rastering in a line-by-line pattern, the stepper motors may cause the nozzle 509 to move in other 2D patterns in the 2D plane to cause the liquid to be deposited at certain x, y coordinates.

FIG. 5 does not show apparatus for heating and pressing multiple layers of substrate, or for removing excess substrate. In some implementations, the substrate layer is moved to a different position before those steps occur.

Processors

Figure 6:
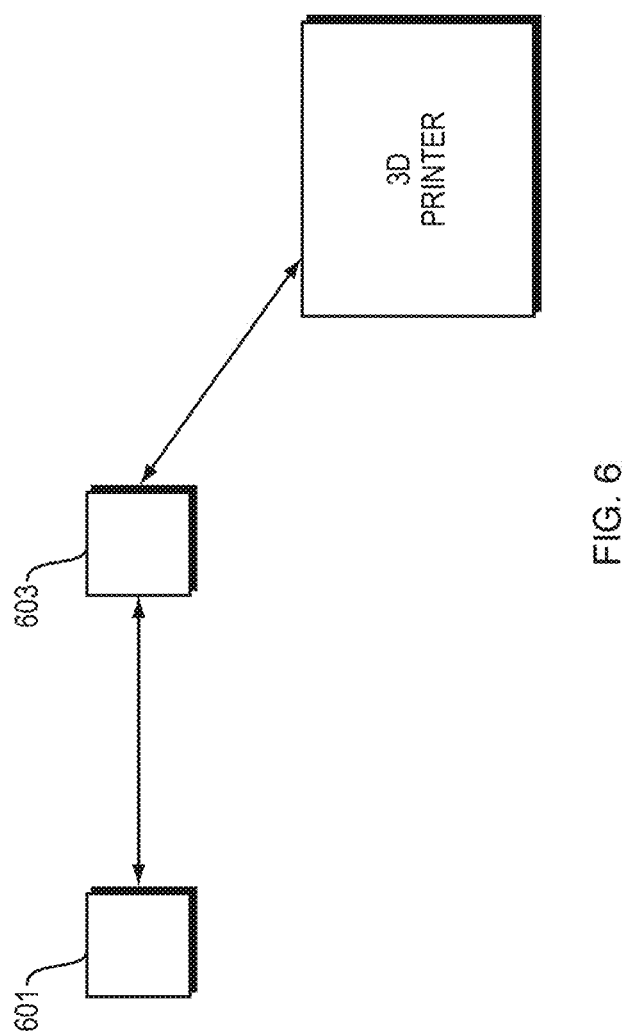
FIG. 6 is a high-level block diagram of processors in an illustrative implementation of this invention.

In exemplary implementations, computer processors are used to control the 3D printing process. FIG. 6 is a block diagram that shows a plurality of processors, in an illustrative implementation of this invention. A CAD model of a desired 3D object in STL file format is created using a remote processor 601. This processor 601 employs software (such as Netfabb® Studio software) to create a machine-specific build file. The machine-specific build file is exported to a second processor 603. Depending on the particular implementation, this second processor controls the operation, including movements, of: (1) an inkjet head or other device that selectively deposits liquid, (2) actuators that spread out the powder on the substrate and then remove the excess powder, (3) a thermal print head, (4) a heating and/or compression device, or (5) actuators that feed or flip over substrate layers. Alternatively, this invention may be implemented with other arrangements of processors. For example, more than one remote processor and more than one onboard processor may be employed, and any of the above tasks may be handled by one or more of these different processors.

Printer

In some implementations of this invention, an ink jet printer is used to selectively deposit liquid on a substrate layer. The liquid is conventional ink used for an inkjet printer. Alternately, water or another wetting liquid may be used as the liquid. The ink jet head is rastered, or otherwise moved in a 2D pattern, across the substrate layer, using x- and y-stepper motors. As the inkjet printer head is rastered, it can print multiple lines of ink with each pass. After the liquid is selectively deposited on the substrate layer, the layer is flooded with powder. The powder adheres where the liquid is present. Then excess powder that does not adhere to the liquid is removed. A heated press is used to melt the powder and to press layers of substrate together. All of these steps—inkjet printing, application of powder and removal of excess powder, and the heated press or iron—may be automated, in order to improve the precision and speed of steps in the process.

The example approach employing an ink jet printer and heated press has a number of advantages. First, it may be implemented using simple, low-cost apparatus. Second, it is fast: for example, ink jet printers can achieve rates of 400 feet per minute. Third, objects can be printed in color and decorated. For example, in a prototype of this invention, dyes or pigment-based inks can be used, allowing fully decorated parts to be made. The ink jet heads can be inexpensive. For example, disposable, inexpensive thermal inkjet heads (such as HP45 available from Hewlett Packard Company) can be used. The ink jet approach may also be scaled easily. For example, the thermoplastic may be selectively applied to large (long) sheets of substrate. Unlike laser sintering and fused deposition, there is no need for a precision oven. The surface tension and evaporation of the liquid can be modified by using a liquid other than water, or by adding other compounds (such as ethylene, propylene glycol, or 2-pyrrolidinone) to the water.

In a preferred embodiment of the CBAM process, printing is accomplished through automated processes, such as, but not limited to, those described in U.S. patent application Ser. No. 14/835,685, U.S. patent application Ser. No. 14/835,697, U.S. Pat. Nos. 9,833,949, 9,827,754, and 10,046,552, all of which have been incorporated by reference herein in their entirety.

Example Implementation—Prototype #1

In a first prototype, the substrate is comprised of polyester (nylon) fabric. A first layer of substrate is placed on a hot stamp press. A second layer of substrate is placed on another surface (not on the hot stamp press). Water is then selectively applied to that second substrate layer. Alternatively, in this prototype, an alcohol may be selectively applied to the substrate layers instead of water. The second layer is then flooded with Shaetti® SF 400 thermoplastic powder. The powder adheres to the water that was applied to the second layer. The second layer is turned upside down and flicked, which causes the excess powder, which is not adhering to the water, to fall off. The second layer of substrate is then placed in the hot stamp press, while still upside down, with the powder adhering to the bottom of the second layer. When it is so positioned, the second layer is on top of the first layer. The hot stamp press then heats and presses the two layers together. The process is repeated by adding a third layer of substrate, fourth layer and so on, each in the same manner as the second layer. Each time that the hot stamp press does a "stamp", it melts the powder beneath the top substrate layer. The resulting molten material coats a portion of the substrate layers, then cools and solidifies, causing the then current top and second-to-top layers of substrate to adhere to each other. The portion of the substrate to which the powder adhered is coated in a solidified plastic material.

In this prototype, each layer of substrate has guide holes in it to facilitate alignment of the substrate layers. Registration guides that are, for example, posts attached to the hot stamp press are inserted into the guide holes of each layer of substrate, in order to make the substrate layers align with each other. Alternatively, in this prototype, the substrate layers may be aligned and placed, one on top of another, in a compressive device that is tightened to apply pressure to compress the substrate layers together. This device, once tightened, may be placed in an oven (such as, but not limited to, a conventional toaster oven).

After all of the layers of substrate have been added and pressed together, the resulting object is taken off the hot stamp press. It is then placed in an aqueous solution of methanol and sodium hydroxide. The solution causes the excess substrate, which is not coated by the solidified material, to degrade. In order to speed up this degradation, the solution is heated and stirred by, for example, a magnetic stirrer. After the excess substrate is removed, what remains is the desired 3D object. This 3D object comprises solidified plastic (that resulted when the thermoplastic powder cooled) and the portion of the nylon substrate that it coats.

In this prototype, a stain repellant, such as, but not limited to, Scotchguard® Fabric & Upholstery Protector (available from 3M, St. Paul, Minn.), may be sprayed onto each substrate layer before liquid is selectively deposited on the layer. This reduces the amount of liquid that is absorbed by the substrate and the distance the liquid spreads in the substrate. Alternatively, or in addition, each substrate layer may be suspended over a frame, so that the center portion of the layer is not touching any solid surface. This, too, tends to reduce the absorption of liquid by the substrate, and the spreading of the liquid.

Example Implementation—Prototype #2

In a second prototype, water-soluble paper is selectively printed with water using a 0.005 inch minstac nozzle obtained from the Lee Company, Essex, Conn. (part INZA650935K). In this instance, the amount of water deposited at this step is not enough to substantially dissolve the paper. The nozzle is rastered in a line-by-line pattern (or otherwise moved in a 2D pattern) above the substrate layer using two stepper motors that move in x and y directions. A microcontroller controls the stepper motors, and also controls the opening and closing of the valve in the nozzle. When the valve is open, water under pressure is deposited on the substrate layer.

In this prototype, the paper that is used has been cut on a laser cutter, with two registration holes in the top of the paper. Paper is inserted into a machine where it is aligned on a registration form, and a "slice" of the object is printed with water on the paper. The water is selectively printed in a pattern that corresponds to the particular slice. The paper is then flooded with Shaetti® SF 400 thermoplastic powder, which adheres only where the water has been deposited. The paper is then turned upside down and the excess powder falls off from the areas where no water has been deposited. The piece of paper for the first layer is then set on a registration form with two registration rods, on top of a bottom sheet of paper that was previously placed in the registration form. The paper, with the powder attached, is placed powder side down. This paper is then tacked to the bottom sheet using a tacking iron. This process is repeated multiple times until each layer of the object has been printed. The tacking iron is used to insure that powder remains attached to the paper after the water has dried.

In this prototype, the sandwich of paper is clamped with a C-clamp, using a rubber stopper between the C-clamp and the paper sandwich, so that the force is retained as the paper sandwich is compressed when it is heated. This assembly is then put in an oven above the melting temperature of the thermoplastic powder, for a period of time which is longer as the part becomes larger. This causes the thermoplastic powder to penetrate the paper and glue the sheets of paper together. The paper stack is then removed from the oven and allowed to cool for about half an hour, allowing the thermoplastic to cool and solidify. The stack of paper is then placed in a stream of water from a faucet. The water may be hot, since elevated temperature helps in dissolution. A jet of water (e.g., from a water pick) may also be used to accelerate the removal of the excess paper (i.e., the paper that is not coated with plastic). The excess paper is removed, resulting in a 3D object. Objects that are produced using this prototype are stiff and have good mechanical integrity. Before the excess substrate is removed, it acts as support for the 3D object being produced, allowing for a wide range of geometries to be constructed.

In this prototype, other methods for applying heat and pressure may be used instead of an oven and C-clamp. For, example, a heated press (such as a hot stamping press) can be used to apply heat and pressure to each substrate layer or to a few substrate layers at a time. With a heated press, it can be easy to control the temperature, pressure and duration of each heat/pressure step. Alternatively, for example, the paper layers may be aligned and placed, one on top of another, in a compressive device that is tightened to apply pressure to compress the substrate layers together. The compressive device, once tightened, may be placed in an oven (for example, but not limited to, a conventional toaster oven). The compressive device may include springs or other elastic components that continue to apply pressure even if the thickness of the paper layers decreases (e.g., due to compression).

Example Implementation—Prototype #3

In a third prototype, an inkjet printer is used. The inkjet printer selectively deposits liquid on a substrate layer so that the liquid is on some parts of the substrate layer and not on other parts of the substrate layer. In other words, the inkjet printer prints a pattern of liquid on the substrate layer. The substrate layer is then flooded with thermoplastic powder. The powder adheres to the substrate in accordance with the printed pattern, such that the powder adheres to the portion of the substrate layer where the liquid has been deposited, but does not adhere to the rest of the substrate layer. Thus, the thermoplastic powder is selectively deposited on the substrate layer in a pattern, where the pattern corresponds to the pattern of liquid printed by an inkjet printer.

In this prototype, a rectangular layer of substrate is taped to an 8.5 inch by 11 inch sheet of conventional paper. When doing so, the outer edges of the substrate layer are aligned with a rectangle printed on the sheet of paper. Then, an HP 820CSE inkjet printer (manufactured by Hewlett Packard Company, Palo Alto, Calif.) prints a pattern of ink on the substrate layer. Conventional ink for that printer is used. The printed pattern comprises a grid that defines a matrix of tiles. In this printed pattern, a different cross-sectional "slice" of a three-dimensional object is printed in each of the tiles, respectively.

The foregoing steps may also be automated and performed by machine, such as by the preferred embodiment described in U.S. Pat. No. 10,046,552, which is herein incorporated by reference. In this preferred embodiment, a material feeder holds a stack of substrate sheets and moves them into proper position so that a single sheet at a time can be transferred to a printer. In a preferred embodiment, the substrate sheets are made of carbon fibers with sodium silicate binder. Sheets are transferred to, and positioned for, the printer by means of a transfer system, which may include a gripper subsystem. The printer then deposits fluid onto a substrate sheet, and may optionally include a punching mechanism for placing holes in the sheet at desired locations. For example, the printer prints a layer of a 3D model, and a stack of successive layers from the model are used to produce a 3D object. A powder applicator then deposits thermoplastic powder onto the substrate sheet, whereupon the powder adheres to the areas of the sheet that have been made wet by the printer. In a preferred embodiment, the powder is an engineered powder. A powder remover removes powder that did not adhere to the sheet. In a preferred embodiment, the powder remover includes a vacuum subsystem. A fuser, which is optional, heats the powder on the substrate sheet in a manner sufficient to cause the powder to melt and thereby affix to the sheet, so that the powder remains on the sheet when and if the underlying fluid from the printer dries. This cycle is repeated for as many additional substrate sheets as required for making a specified three-dimensional part, with each sheet normally representing a layer of the 3D part.

Figure 7:
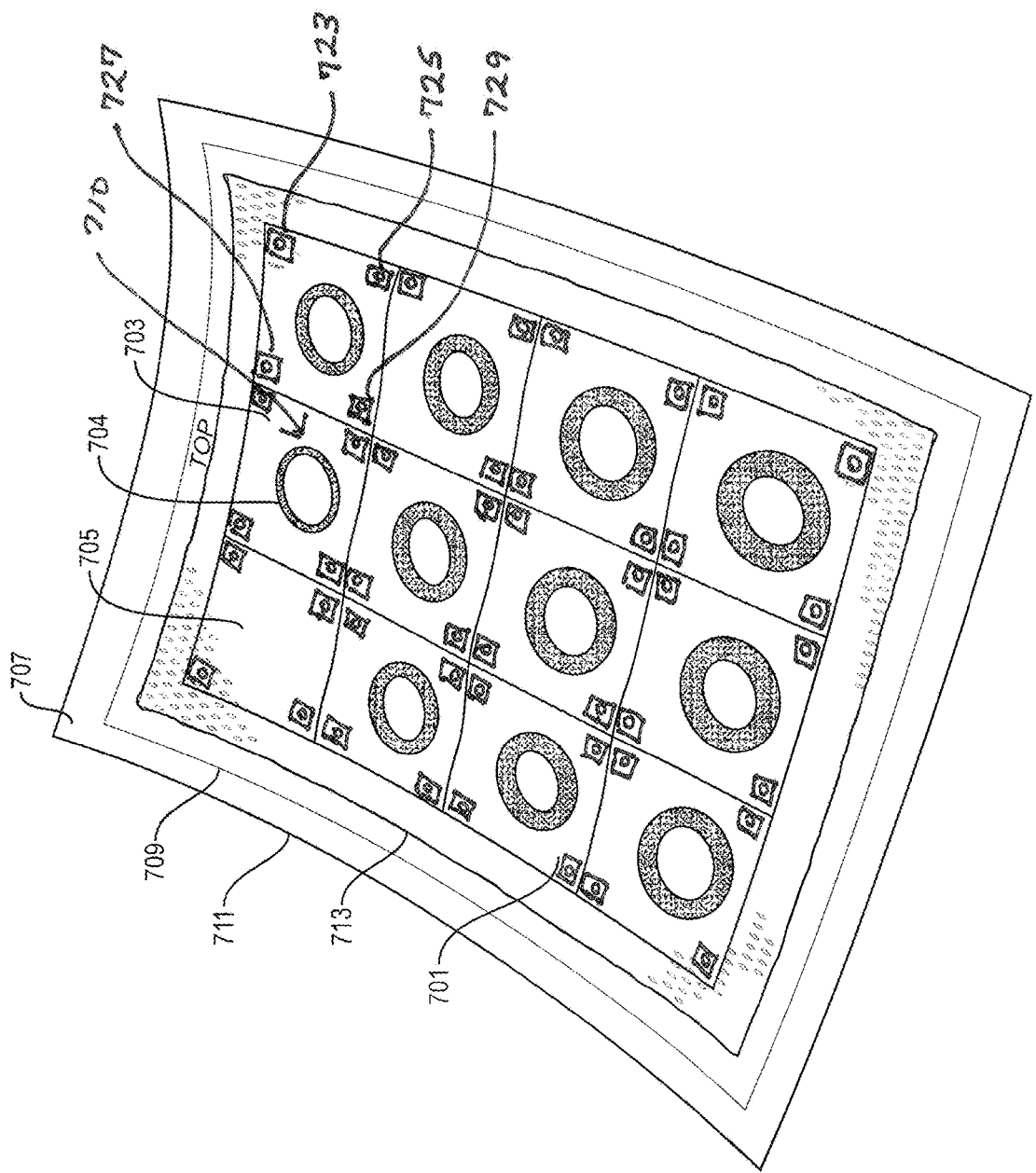

FIG. 7 depicts an illustrative example showing a pattern that has been inkjet-printed on a substrate layer 701. The pattern comprises a grid that defines a 4×3 matrix of tiles. Each tile is a pattern for a single "slice" of a desired 3D object. In the example shown in FIG. 7, a single sheet has a pattern for a 3×4 array of slices (i.e., 12 slices per sheet). In this example, slices from ten such sheets may be used to fabricate a 3D object comprising 120 slices.

In the example of FIG. 7, in each tile, respectively (e.g., 703), a different cross-sectional "slice" (e.g., 704) of a ring torus has been printed by the inkjet printer. In each tile (e.g., 710), there is at least one "positive" area (e.g. 704), corresponding to the region of the slice that will be part of the desired 3D object, and at last one "negative" area (e.g., 703), corresponding to a region of the slice that will not be part of the desired 3D object. The upper left tile 705 in FIG. 7 is a null slice of the ring torus, i.e., it does not include a part of the ring torus.

FIG. 7 shows how the substrate layer is aligned with a sheet of paper 707. On the sheet of paper 707, rectangles have been pre-printed. The substrate layer 701 is taped on the paper so that the outer edges of the substrate layer align with one of these pre-printed rectangles on the sheet of paper. More specifically, in FIG. 7, three rectangles, nestled inside each other, have been pre-printed on the paper. The outer rectangle 711 and central rectangle 709 of these three rectangles are visible in FIG. 7. The innermost of these three pre-printed rectangles on the sheet of paper is not visible in FIG. 7. However, the innermost rectangle is aligned with, and lies directly beneath, the outer edge 713 of the rectangular grid that was printed on the substrate layer by the inkjet printer.

In the four corners of each tile, the pattern includes four registration holes (e.g., 723, 725, 727, 729), one hole per corner. Because the rim, which is square in FIG. 7, of each hole is stronger than the hole itself, the hole can simply be poked out by a hard instrument. Alternately, registration holes may be cut out (e.g., by a laser cutter). In either case, once the holes are formed, registration pins may be inserted through the registration holes in order to align the "slices".

Signatures, in the printing sense, may be used when grouping the slices. In the example shown in FIG. 7, each signature might comprise 6 slices. A total of 20 signatures would then be used to fabricate a 3D object comprising 120 slices. For example, the slice in tile 710 is the first slice out of 120 slices, and would be included in a first signature that comprises the first six slices out of the 120 slices.

After the inkjet printer prints the pattern on the substrate layer, the substrate layer is flooded with thermoplastic powder (e.g. Schaetti® Fix 400 powder). The excess powder is then removed, by turning the paper upside down and tapping the paper with a finger. Other removal methods may be used, such as, but not limited to, vacuuming or blowing the excess powder away.

The substrate layer is then aligned on a laser cutter. The laser cutter then cuts lines that separate the substrate layer into the tiles and cuts two registration holes in each of the tiles.

In this example, each substrate layer is divided into 12 tiles, with a different "slice" of a ring torus printed on each tile, respectively. These tiles are placed in a device for applying pressure (a "compressive device"), one tile on top of another. The compressive device includes one or more elastic components (e.g., springs) to maintain pressure on the substrate layers even if they compress. The tiles are aligned by inserting two guide holes in each tile, respectively, through two guide posts in the press.

Figure 8:
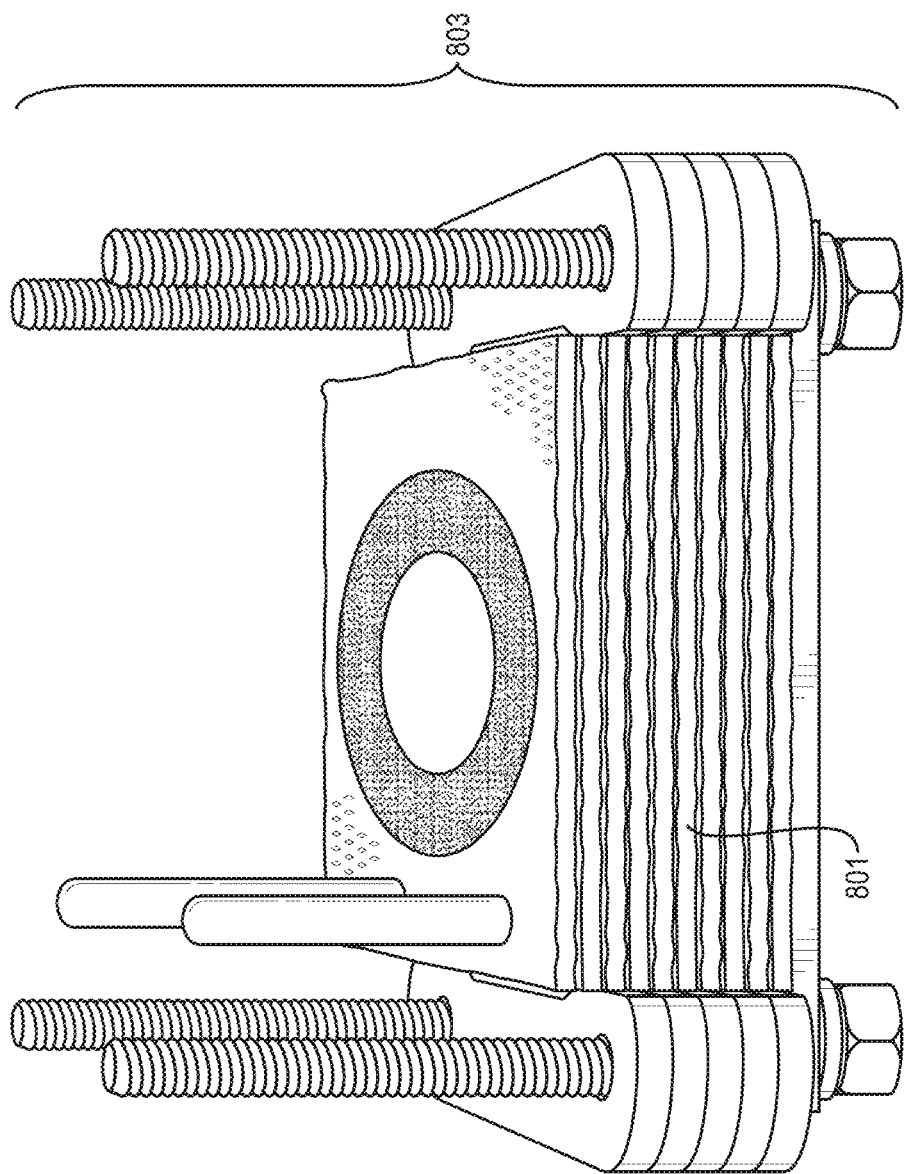

FIG. 8 shows a compressive device 803, after a number of substrate tiles (layers) (e.g., 801) have been placed in it, one on top of the other. If more than 12 tiles are needed, then the process is repeated, until enough substrate tiles (layers) have been produced. In this example, substrate tiles for all of the "slices" of the ring torus are placed into the compressive device. The total number of substrate tiles is more than 12. The process of printing 12 slices on 12 tiles on a substrate layer is repeated, layer by layer, until tiles for all of the slices have been printed. Each of the tiles is itself a substrate layer, and is cut from a larger layer of sheet of substrate. The substrate layers (tiles) that have been inserted into the compressive device are then compressed together by that device.

Figure 9:
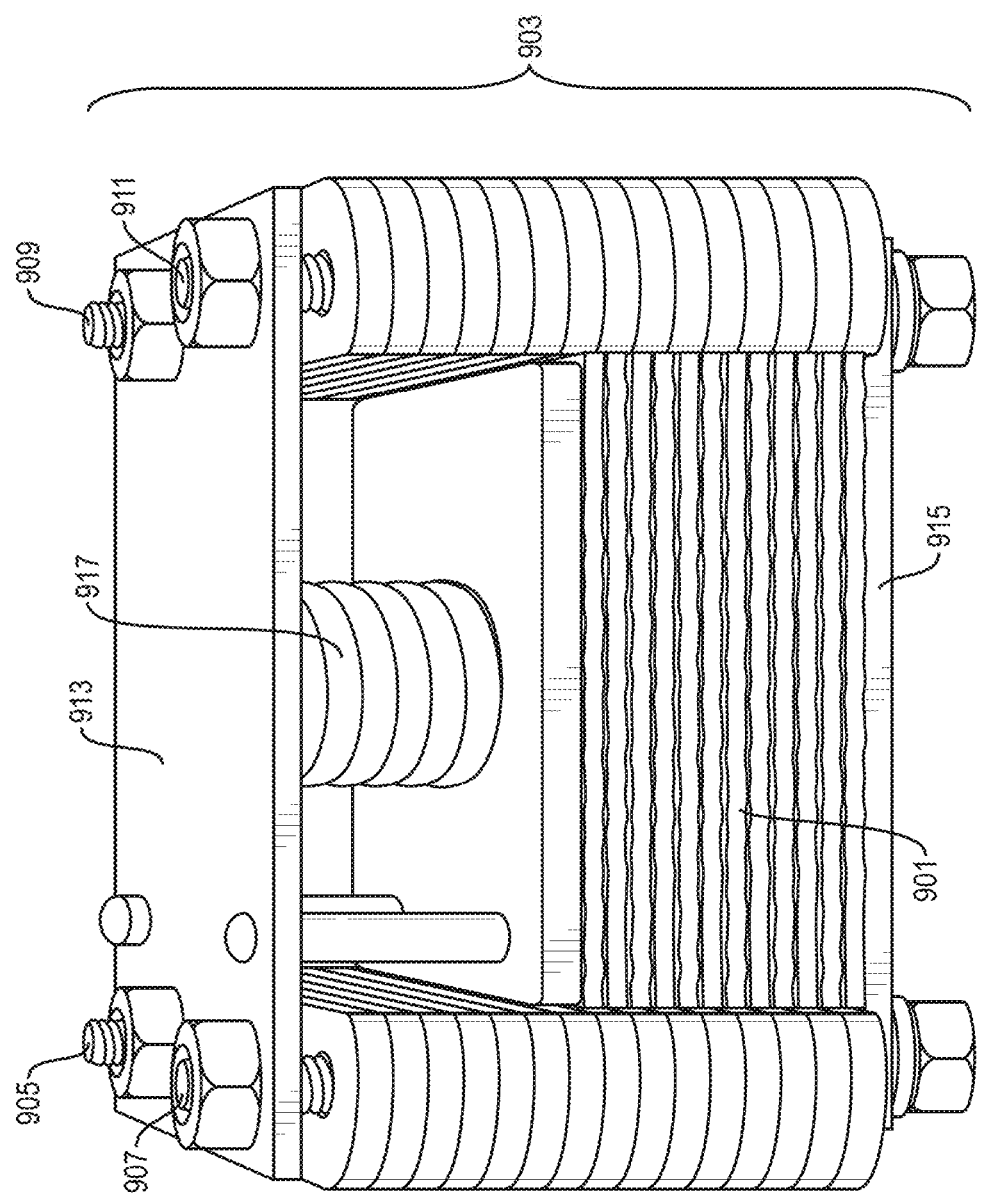

FIG. 9 shows substrate layers being compressed in the compressive device 903. Screws 905, 907, 909, 911, plates 913, 915 and a spring 917 in the compressive device are used to exert pressure.

Once tightened, the compressive device, with the substrate layers in it, is then placed in an oven, which can be, but is not limited to, a conventional toaster oven. The compressive device includes both a spring, to maintain pressure on the substrate layers even if they compress, and a stand-off, clutch, brake or damper to limit movement of the compressive device. Alternatively, the springs in the compressive device may be omitted and simple mechanical pressure of the screws can be used. Alternatively, a hot stamping press can be used to apply pressure.

The heat from the oven causes the thermoplastic powder to melt. The molten material coats the substrate layers. The compressive device, with the substrate layers in it, is then removed from the oven, and the substrate layers are allowed to cool. The molten material then solidifies. As it does so, it binds (fuses) the substrate layers together.

Figure 10:
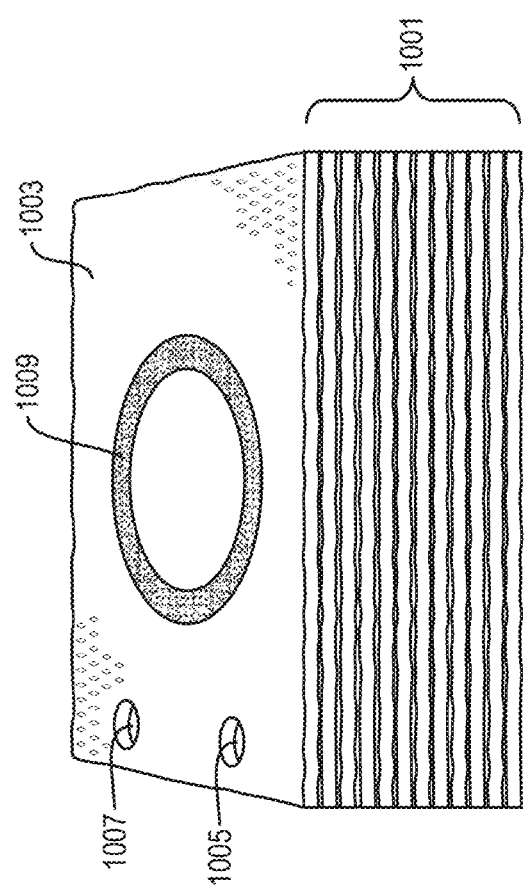

FIG. 10 shows the substrate layers 1001, after they have been fused together into a rectangular cuboid 1003. In this example, a 3D toroid is being fabricated, and the upper-most slice 1009 of the toroid is visible at the top surface of the cuboid 1003. Two registration holes 1007 and 1009 are visible in excess substrate that will be subsequently removed.

Figure 11:
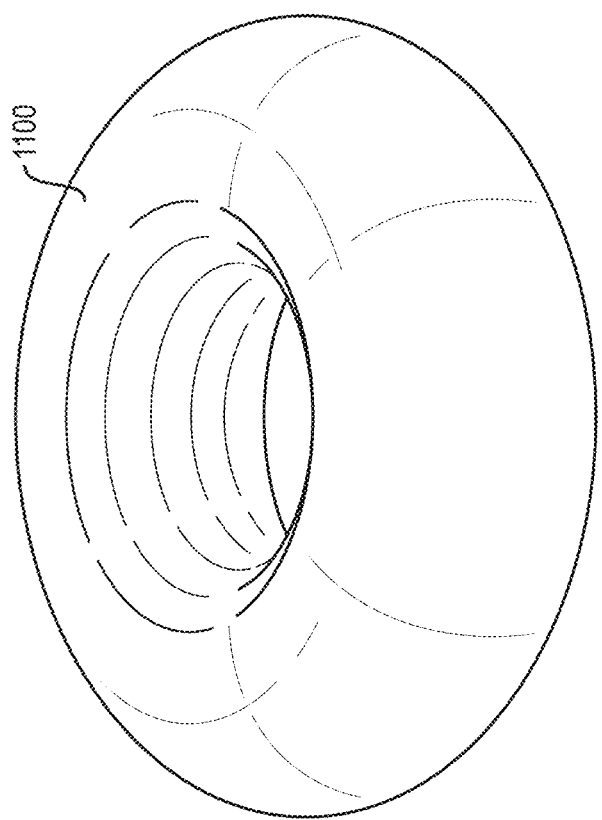

Excess substrate, i.e. substrate that has not been covered by the solidified material, is then removed. In the example shown in FIG. 11, a ring torus 1100 remains after excess substrate in a rectangular cuboid has been removed.

Alternative Methods of Implementing the Invention

This invention is not limited to melting of the powder, in which solid powder becomes liquid. Other transitions may be employed. For example, the powder may undergo a glass transition that allows it to penetrate the substrate. Or, for example, the powder may be transformed into in a bi-phasic material that can penetrate the substrate.

This invention is not limited to fibrous substrates. For example, the substrate may be a composite that comprises particles, ellipsoidal particles, flakes, small platelets, small ribbons, or particulates of any other shape, or a combination of two or more of these, which are bound or glued together by another material.

Figure 12A:
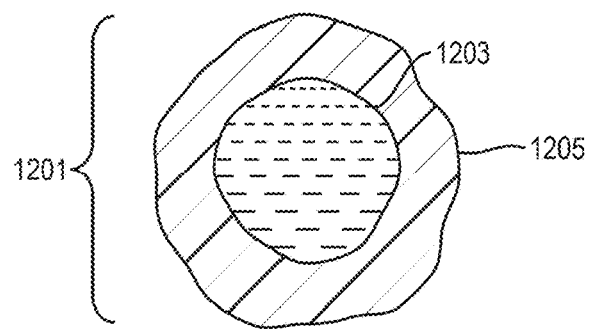
FIG. 12A shows a grain of powder that microencapsulates a liquid.

In some embodiments, this invention may be implemented using grains of powder that each encapsulate (or microencapsulate) a resin or other liquid. In the example shown in FIG. 12A, a powder grain 1201 comprises a solid outer layer 1205 of thermoplastic or thermoset plastic. The outer layer 1205 encapsulates liquid 1203. The powder may be selectively deposited. Pressure (and heat) may be applied to burst the encapsulation. The resin or liquid may then infiltrate into the substrate layers. The resin may harden upon exposure to air, to a reactant, reagent, catalyst, or solvent, or to electromagnetic radiation.

Figure 12B:
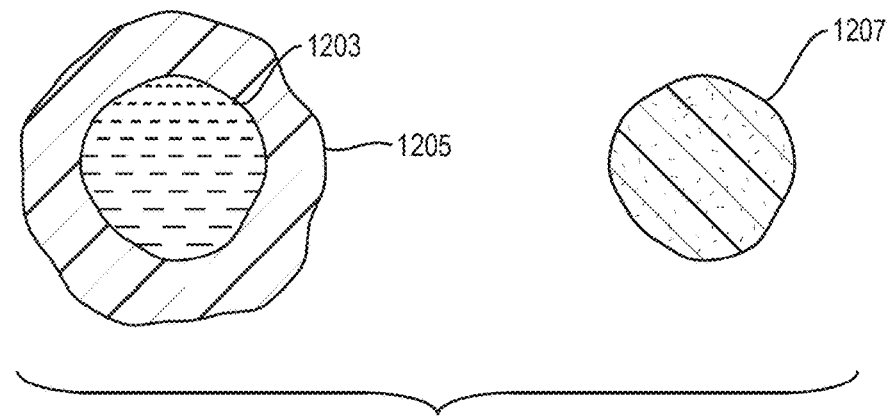
FIG. 12B shows a powder mixture that comprises two types of grains: first, a completely solid grain; and second, a grain that comprises a solid outer layer that encapsulates a liquid.

In an illustrative embodiment of this invention, grains of powder encapsulate (or microencapsulate) epoxy resin. Grains of epoxy hardener are also mixed into the powder. The powder mixture is selectively deposited. Pressure (and heat) may be applied burst the encapsulation, so that the resin penetrates into the substrate layers and then hardens. In the example shown in FIG. 12B, the powder mixture comprises two types of grains: first, completely solid grains of epoxy hardener 1207; and second, grains that comprise a solid outer layer 1205 that encapsulates a liquid epoxy resin 1203.

Alternatively, the substrate may be flooded with powder that encapsulates liquid. Pressure may be selectively applied (e.g., with a dot matrix print head) to burst the encapsulation, so that the liquid infiltrates the substrate layers and then hardens.

In example implementations of this invention, a variety of means may be used to transform powder into a substance that flows and then subsequently hardens. For example, the means may comprise a heating element. The heating element may comprise any artificial heat source that heats by one or more of conduction, convection or radiation. For example, the heating element may comprise: (1) a resistor or any other resistive heating element; (2) any other device that converts electricity into heat by ohmic heating; (3) a hot stamp press or any other apparatus for applying heat and pressure; (4) an oven; or (5) an artificial source of electromagnetic radiation, including a heat lamp, an artificial infrared light source, a laser; or an artificial source of microwave radiation.

The transformation means may alternatively, or additionally, comprise an artificial pressure source, including a press, clamp, iron, roller, pump, piston, or elastic element (e.g. spring) for applying pressure. The pressure may be used, for example, to compress layers together or to squeeze the flowing substance into interstices in the substrate layers. Alternatively, for example, the pressure may be used to crush, rupture, or burst grains of powder that encapsulate liquid. The liquid may then flow, and may harden or cause something else to harden. The heating element or pressure source may be configured to transform powder into a substance that flows and then subsequently hardens.

Figure 13:
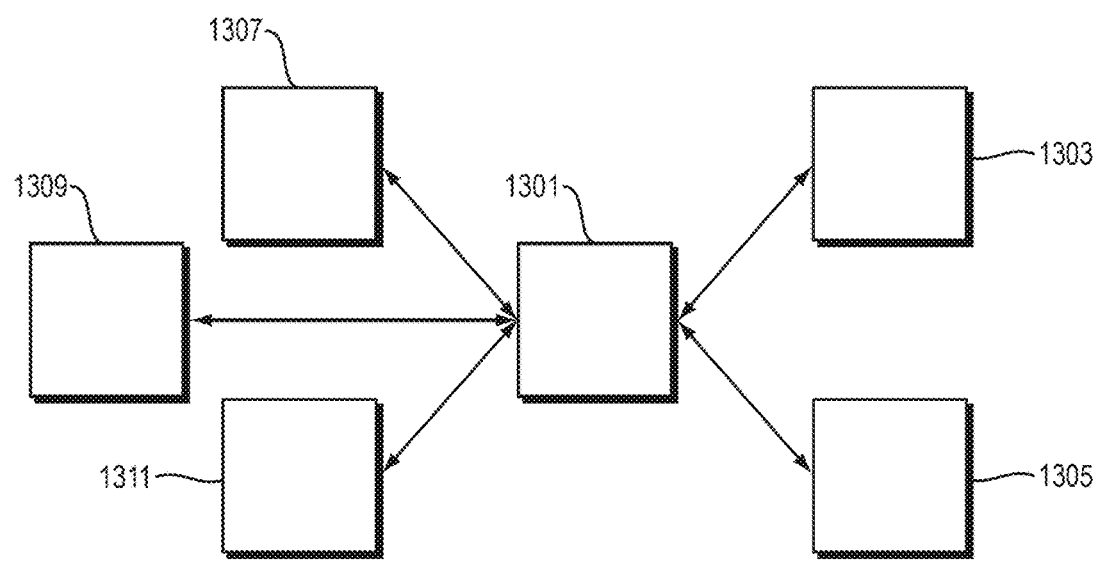
FIG. 13 is a block diagram that shows a processor that controls multiple components of an apparatus for fabricating a 3D object, according to one aspect of the invention.

The transformation means may alternatively, or additionally, comprise a reagent, reactant, catalyst, solvent or solute used in a chemical reaction. The reaction may soften or harden all or a portion of the powder. An applicator may be configured to apply, deposit, or deliver the reagent, reactant, catalyst, solvent, or solute to the powder. Also, for example, the means may comprise an artificial source of electromagnetic radiation. The radiation may, for example, be used for hardening the powder, including by curing. The radiation source may be configured to transform powder into a substance that flows and then subsequently hardens FIG. 13 is a high-level block diagram of an example hardware implementation that may be used in this invention. As shown in FIG. 13, one or more processors 1301 control an applicator 1303, a heating element 1305, an actuator 1307, an artificial pressure source 1309, and a stirrer in a container of liquid 1311. The applicator 1303 deposits powder in positive regions, but not in negative regions, of substrate layers. The heating element 1305 transforms the powder into matter that flows and then hardens. The resulting hardened material is disposed in a spatial pattern that infiltrates the substrate layers. The artificial pressure source 1309 may comprise a press, clamp, spring, elastic element, or any other device known in the art for compressing the substrate layers. The stirrer may be used to stir a liquid that is used for removing excess substrate.

Figure 14A:
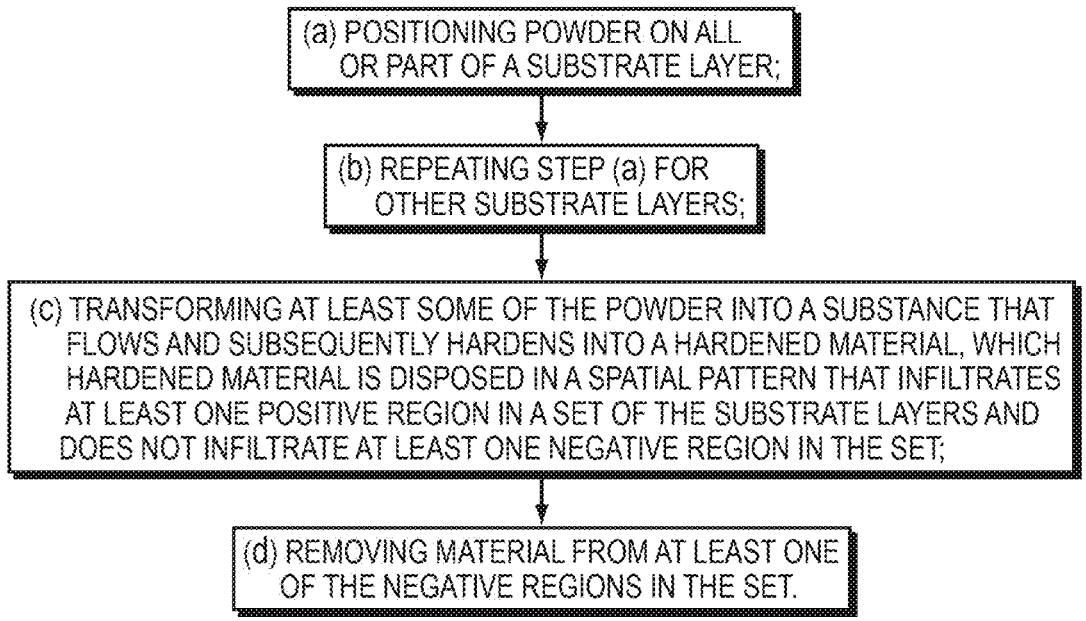
FIG. 14A is a high level flow chart of steps in an example implementation of this invention.
Figure 14B:
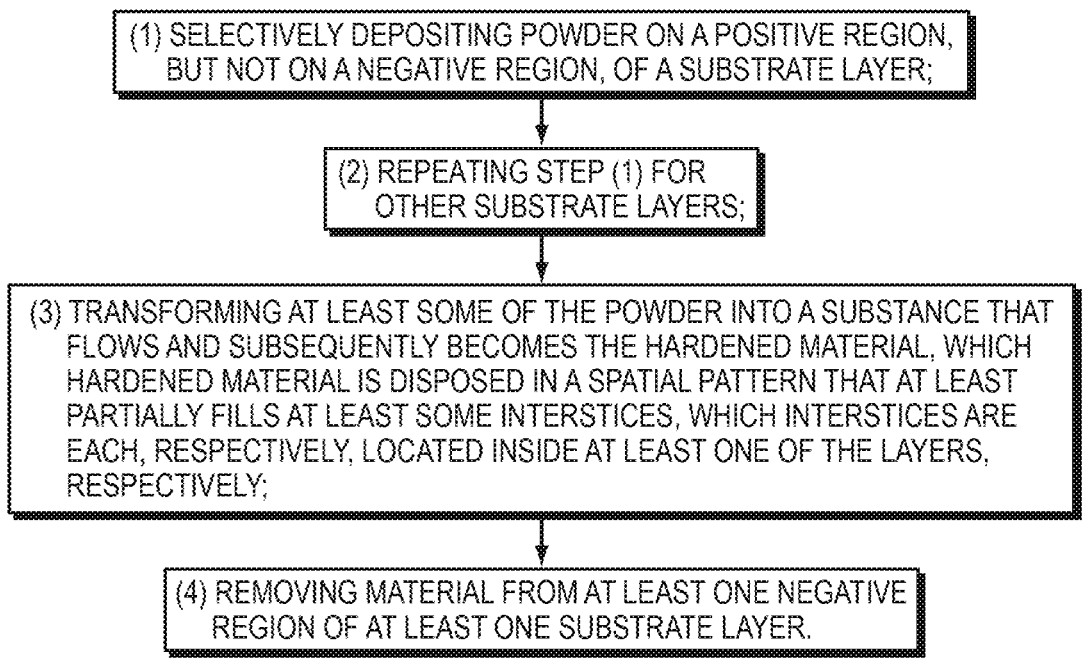
FIG. 14B is a high level flow chart of steps in another example implementation of this invention.

FIGS. 14A and 14B are each flow charts of steps used to fabricate a 3D object, in two different illustrative embodiments of this invention.

In some implementations of this invention, the melted or softened powder may enter the substrate layers by absorption.

In certain preferred implementations of the invention, the excess substrate is removed after the transformation step by mechanical abrasion. In some embodiments, the mechanical abrasion is achieved by abrasive blasting. According to principles of this invention, abrasive blasting may be used to remove material in a wide range of 3D printing technologies, including fused deposition. Abrasive blasting has the advantage of being faster than many other subtractive techniques.

Figure 15:
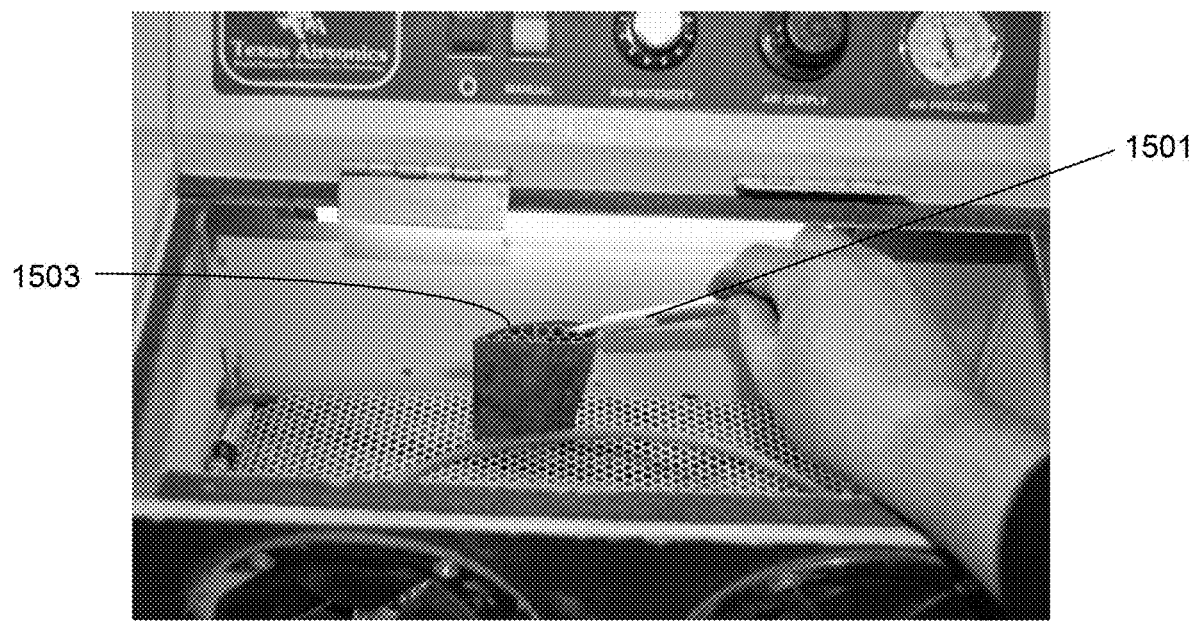
FIG. 15 shows part of an abrasive blasting apparatus as it starts to abrade the excess region from a stack of carbon fiber layers in an example implementation of the invention.

FIG. 15 shows part of an abrasive blasting apparatus 1501, as it starts to abrade the excess region from a stack 1503 of carbon fiber layers. In FIG. 15, the abrasive blasting has not yet removed any of the excess region. The stack 1503 of layers had been fused together when thermosetting or thermoplastic powder hardened.

Figure 16:
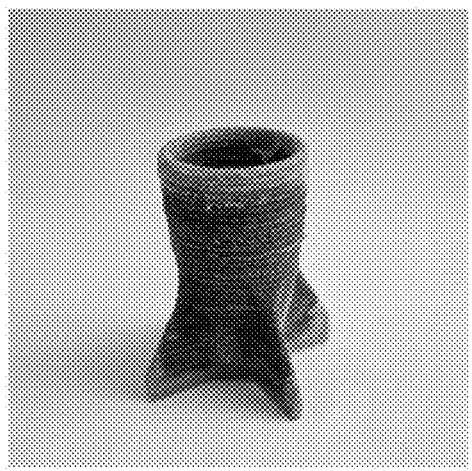
FIG. 16 is a photograph of a 3D object, comprising a carbon fiber composite material, which was fabricated by a prototype of this invention.

FIG. 16 is a photograph of a 3D object, comprising a carbon fiber composite material, which was fabricated by a prototype of this invention. FIG. 16 is a photograph of a vase, after excess regions in the stack of carbon fiber layers have been removed by abrasion. The remaining portion of the stack corresponds to the vase shape of the target 3D object. The excess regions that were removed were weaker (more fragile or friable) and were easier to abrade than the printed portion, because no thermosetting resin or thermoplastic powder hardened on the excess regions.

Figure 17:
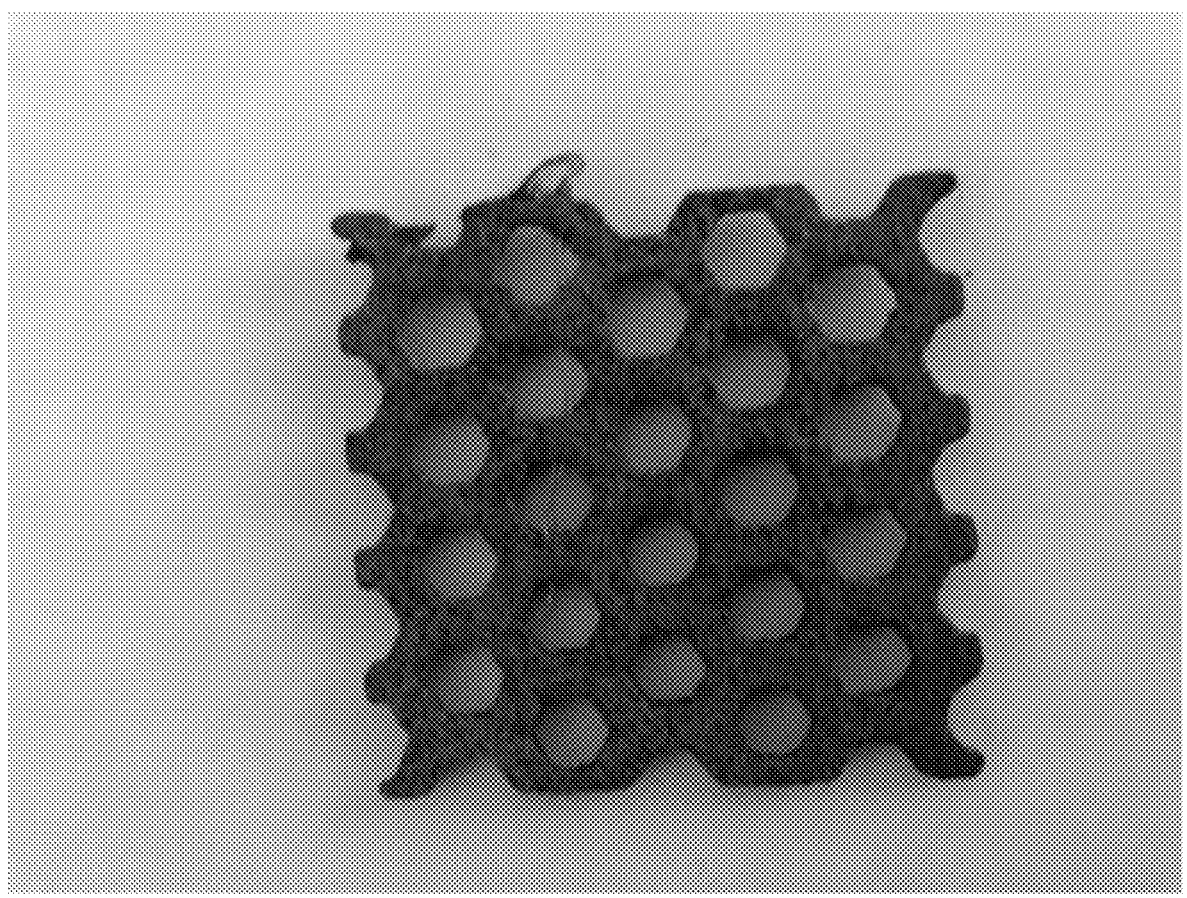
FIG. 17 is a photograph of a 3D object, comprising a carbon fiber substrate and an engineered powder, which was fabricated according to an aspect of the present invention.

FIG. 17 is a photograph of a prototype 3D object, comprising a carbon fiber substrate and an engineered powder, which was fabricated according to an aspect of the present invention. The engineered powder used in the prototype of FIG. 17 is a Polyamide 12 (PA-12) powder having a target particle size of 50 μm.

Figure 18A:
FIG. 18A is a photomicrograph of an example engineered powder that is useable in the present invention.
Figure 18B:
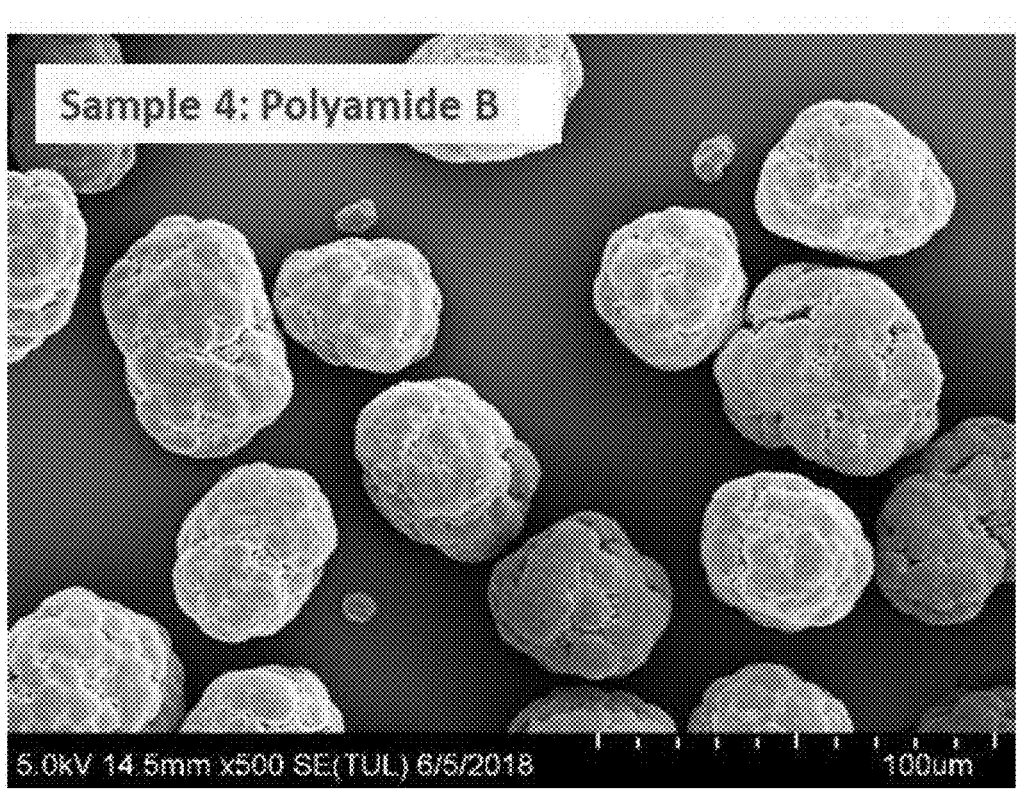
FIG. 18B is a photomicrograph of a prior art precipitated powder, shown as a comparison to the engineered powder of FIG. 18A.

To obtain the engineered powder used for the prototype of FIG. 17, Polyamide 12 (PA-12) pellets were converted into powders of the target particle size (50 μm) by Xerox Research Centre Canada (XRCC) in the XRCC Pilot Plant, with 10 kg of precipitated PA-12 powder being produced. FIG. 18A is a photomicrograph (400×) of this example engineered powder. For comparison purposes, FIG. 18B is a photomicrograph (500×) of a prior art precipitated polyamide 12 (PA-12) powder.

The polyamide powder material of FIG. 18A was analyzed by numerous tests. Particle size, particle size distribution, and shape data were obtained with the Multisizer 3 Coulter Counter, Sysmex FPIA 3000 and optical microscopy analysis. The powders ranged in size from 80-95 microns, based on d50(v), with wide size distributions and circularity around 0.75 to 0.87. ICP-OES quantified aluminum, calcium, sodium, iron, silicon and titanium through the entire particle. Powder compaction as aerated and tapped bulk density and flow as angle of repose was measured by the Hosokawa Powder Flow tester and an excellent correlation was found. BET surface area was measured using the Micromeritics ASAP-2460 instrument. Moisture content by Karl Fischer quantified the amount of water in and on the particles and was low at <1%. Melt flow index data was correlated with percent moisture, which was obtained using the Tinius Olso MP993 Extrusion Plastomer. SEM images at low and high magnification provided very good information on the particle morphology.

It will be clear to one of skill in the art of the invention that the engineered powders comprising one aspect of the invention may be used with substrates including the sodium silicate binder of another aspect of the invention, as well as being useable with substrates having other binders. Similarly, substrates including sodium silicate binder according to one aspect of the invention may be used with engineered powders according to another aspect of the invention or with powders created by other means, including, but not limited to, grinding or precipitation.

Illustrative Implementation Using Thermoplastic Polymer Powder

In an illustrative implementation of this invention, a composite 3D object is produced as follows:
1. Cut nonwoven carbon fiber substrate layer on laser cutter. Cut registration holes into the layer. The substrate can be cut in advance of the rest of the process.
2. Put nonwoven substrate layer on registration post of printer.
3. "Print" a slice. (In this step, liquid is selectively applied to the carbon fiber substrate layer, e.g., by inkjet printing).
4. Remove carbon fiber substrate layer from printer.
5. Flood carbon fiber substrate layer with thermoplastic powder. The powder adheres or "sticks" to the substrate only where the liquid was applied.
6. Remove excess powder by turning carbon fiber substrate layer over and shaking until excess powder it falls off.
7. Remove any remaining excess powder with a stream of compressed air.
8. Place carbon fiber substrate on a heated surface (e.g., a hot griddle or other heating element) and melt the powder that adhered to the printing liquid. Preferably, the heated surface has been previously treated with polytetrafluoroethylene, so that the carbon fiber substrate does not stick to the heated surface. Alternately, a layer of another material may be interposed between the heated surface and the carbon fiber substrate, to prevent sticking
9. Place the printed carbon fiber substrate on a fixture using registration holes to align.
10. Return to step 2 until all layers have been printed and placed on the fixture, creating a stack of printed carbon fiber/polymer powder layers
11. Place the stack into a compression device. Then use the compression device to apply pressure to the stack. The compression device may include, for example (1) springs for applying compression; and (2) bolts or standoffs for limiting the amount that the substrate layers are compressed.
12. Preheat oven.
13. Put compression device (with stack of carbon fiber layers in it) in oven.
14. Heat the compression device (with the carbon fiber layers in it) for appropriate time.
15. Remove compression device from oven.
16. Let compression device cool to room temperature.
17. Open up the compression device (e.g., in some cases, by unscrewing nuts).
18. Remove fused 3D object from the compression device.
19. Remove the excess region of each substrate layer by abrasive blasting. The excess region is the portion of the substrate layer that was not covered or permeated by the melted thermoplastic material.

In certain preferred implementations of this invention, a composite 3D object is produced, layer by layer, using carbon fiber substrate layers. A CAD model of the desired 3D object is produced first. Then a software program (e.g., a Netfabb® program) slices the CAD model into slices of correct thickness and produces bitmaps for each layer. A non-woven carbon fiber substrate may be used. Alternatively, woven or chopped carbon fiber substrate may be used. The substrate may further comprise a sodium silicate binder.

An applicator may selectively deposit liquid on each carbon fiber substrate layer. In some implementations of this invention, the applicator may comprise, for example, an inkjet head. The inkjet head may be housed in an inkjet printer. Alternately, the inkjet head may be affixed to another device that is configured to position the inkjet head for printing, e.g., by rastering or moving the inkjet head to a particular x,y-position over the carbon fiber layer. The inkjet head may be a thermal head or, alternatively, any other type of inkjet head, including a piezoelectric head.

The applicator may move over the carbon fiber substrate layer. As it does so, the applicator may "print" a swath of the bitmap onto the carbon fiber by selectively depositing liquid onto the carbon fiber. A wide variety of fluids may be deposited by the applicator. For example, conventional inkjet ink may be used. Alternately, the fluid in the applicator may be a mixture of distilled water and 2-Pyrrolidone. For example, the mixture may comprise 10% to 50% 2-Pyrrolidone, and the rest distilled water. The mixture (of distilled water and 2-Pyrrolidone) may be used for the purpose of reducing the evaporation rate of the fluid from the carbon fiber. Other fluids (e.g., glycols) can be used for this purpose. In a prototype of this invention, the applicator comprises an HP45A inkjet cartridge (available from Hewlett-Packard Company).

The carbon fiber layer may then be removed from the apparatus where the liquid was dispensed. The carbon fiber layer may then promptly (so that the liquid does not evaporate) be flooded with nylon powder. For example, the nylon powder may have an average grain size in the range of 50 to 100 microns. Alternately, other polymer powders such as polyethylene or PEEK (polyether ether ketone) can be used. Advantageously, PEEK is a high performance resin.

Powder adheres where the liquid was deposited by the inkjet head. The excess powder (which did not adhere to the deposited liquid) can be removed by shaking the substrate layer upside down and then blowing it with an air hose. This removes the excess powder that may have been trapped in the crevices of the substrate layer. The carbon fiber layer may be placed on a heated surface (e.g., a griddle) or placed adjacent to any heating element. The heat melts and thus better attaches the remaining polymer powder so that the remaining powder tends not to be displaced in further handling.

Each of the sheets of carbon fiber may then be placed on four registration posts in a compressive device. The process above (print on substrate layer, then put substrate layer on the registration posts) may be repeated until all of the carbon fiber layers have been "printed" with thermoplastic powder and placed on the registration posts of the compressive device. The compressive device may include one or more plates, springs, nuts and bolts to apply pressure to the stack of carbon fiber layers. The pressure may compress the stack. The compressive device may be configured to apply a constant amount of pressure even as the dimensions of the stack change under heat and pressure. A standoff, separator or other mechanical component (e.g., a nut) can be used to maintain a minimum distance past which the stack of carbon fiber layers cannot be compressed.

The compressive device is placed in an oven. The time spent in the oven and the temperature of the oven may be chosen depending on the size of the desired object. The heating causes the layers to fuse together. As the powder melts, it covers the fibers. The compressive device is later cooled and the molten material hardens. After that, bolts holding the plates are loosened and the stack of layers is removed from the compressive device.

Abrasion may be used to remove excess regions of carbon fiber layers (where the melted powder did not coat or infiltrate). Carbon fiber is quite fragile in bending and can be abraded. However, the portion of the substrate layer which has been impregnated with the thermoplastic or thermoset material is quite hard and stiff and resistant to abrasion. The largest portion of the excess region may be removed by scraping with a dental tool. Also, for many geometries, the final removal can be done with a wire brush. In addition, abrasive blasting can be used to remove the uncoated carbon fiber. Also, abrasive blasting can clear internal channels in the 3D object.

After removing the excess region, the result is a stiff 3D printed carbon fiber composite of nearly arbitrary geometry. This fiber composite is fabricated without the use of tooling and in accordance with a CAD model.

If woven fabric is used, then the orientation of the carbon fiber fabric can be adjusted and the weave of the fabric changed so that layers may have different orientations to give the part greater strength in various directions.

In some implementations of this invention, no mold design is required. Thus, each part can be different and customized. So, for example, door panels of cars can be made which are customized by and for the customer. In contrast, in conventional car manufacturing, car panels are stamped out of metal, tooling costs can be extremely high, the costs of the presses can be large, and the time to produce the tooling can be long. The present invention can overcome all of these problems.

In some implementations, a composite material including carbon fiber is produced. The composite material may exhibit desirable electrical characteristics. For example, if the carbon fibers in the composite are continuous, the composite may exhibit appreciable electrical conductivity. In some implementations, ferrite particles or other materials can be included with the resin or powder in order to reduce the radar signature of the part for use in stealth aircraft and other radar avoiding devices.

Alternatively, other types of substrates may be used, including other fabrics that have similar properties. For example, other substrate materials that can be abraded or abrasively blasted, such as, but not limited to, fiberglass, ceramics, or polymers, such as certain polyesters, may be used.

In one aspect, this invention may comprise an article of manufacture. Advantageously, in some implementations, using powder permits the finished 3D product to have a high resolution in at least one dimension. In one example, powder is selectively deposited on substrate layers. For each layer, two substeps occur: first, an inkjet head is used to dispense liquid, and second, powder is applied and adheres to the liquid. The powder is then heated and flows, infiltrating the layers, and cooling into a solidified material that binds the substrate layers together. In this example, the spatial resolution of an exterior surface of the 3D product may be approximately equal to the resolution of the inkjet head in an x, y-direction and to the thickness of a substrate layer in the z-direction.

In an illustrative implementation, an article of manufacture may comprise substrate layers infiltrated by a hardened material. The hardened material may be a thermoplastic. For example, an exterior surface of the hardened thermoplastic may have a spatial resolution of 60 or more dots per centimeter in at least one dimension, and the thermoplastic may have a viscosity of 50 or more centipoise at 50 degrees centigrade above the thermoplastic's melting temperature. Or, for example, an exterior surface of the hardened thermoplastic may have a spatial resolution of 170 or less microns in at least one dimension, and the thermoplastic may have a melt flow rate of at least 70 grams/10 minutes.

This invention may be implemented as a method of fabricating a 3D object, which 3D object comprises a plurality of substrate layers that are infiltrated by and bound together by a hardened material, the method comprising the following steps, in combination: (a) positioning powder on all or part of at least one of the layers; (b) repeating step (a) for remaining layers in the plurality of substrate layers; and (c) transforming at least some of the powder into a substance that flows and subsequently hardens into the hardened material, which hardened material is disposed in a spatial pattern that infiltrates at least one positive region in a set of the substrate layers and does not infiltrate at least one negative region in the set; wherein the powder is transformed in step (c) after being positioned in either step (a) or step (b), and wherein the substrate layers have at least one material property that is different than any material property of the hardened material. Furthermore: (1) the positioning may comprise selectively applying the powder to part but not all of a surface of the layer; (2) the positioning may be in accordance with a machine-readable digital model of a slice of the 3D object; (3) the transforming may comprise melting at least part of the powder; (4) the powder may comprise grains that each, respectively encapsulate a liquid, and the transforming may comprise rupturing, bursting or crushing at least some of the grains; and (5) the transforming may comprise a chemical reaction.

This invention may be implemented as a method of fabricating a 3D object, which 3D object comprises a plurality of layers and a hardened substance that binds the layers together, the method comprising the following steps, in combination: (a) selectively depositing powder on a positive region, but not on at least part of a negative region, of one of the layers; (b) repeating step (a) for remaining layers in the plurality of layers; (c) transforming at least some of the powder into matter that flows and subsequently becomes the hardened substance, which hardened substance is disposed in a spatial pattern that infiltrates the layers; and (d) removing material from at least one negative region of at least one substrate layer; wherein the powder is transformed in step (c) after being deposited in either step (a) or step (b), and wherein the substrate layers have at least one material property that is different than any material property of the hardened substance. Furthermore: (1) the selectively depositing powder on a positive region of the one of the layers may comprise a first substep and a second substep, the first substep comprising selectively depositing liquid on the positive region, and the second sub step comprising positioning the powder on or adjacent to the one of the layers to adhere the powder to the liquid; (3) the selectively depositing may further comprise a third substep, which third substep comprises removing powder that does not adhere to the liquid; and (4) the layers may comprise PET or PLA and an alkali, alone or together with one or more other substances, may be used for the removing This invention may be implemented as apparatus for fabricating a 3D object, which object comprises a plurality of layers and a hardened substance, the apparatus comprising, in combination: (a) an applicator, the applicator being configured for selectively depositing powder in at least some positive regions, but not in at least some negative regions, of at least some of the layers; and (b) a heating element, the heating element being configured for transforming the powder into matter that flows and then hardens into the hardened substance, which hardened substance binds the layers together and is disposed in a spatial pattern that infiltrates the layers; wherein the substrate layers have at least one material property that is different than any material property of the hardened substance. Furthermore: (1) the apparatus may further comprise an artificial pressure source, the pressure source being configured for applying pressure to one or more of the layers; (2) the pressure may be applied during softening of the powder; (3) the apparatus may further comprise one or more actuators, the one or more actuators being configured for translating one or more of the powder and the layers; (4) the apparatus may further comprise an additional actuator, the additional actuator being configured for translating the applicator into different positions while the applicator selectively deposits the powder; (5) the apparatus may further comprise a processor, the processor being configured for outputting control signals to control the applicator and heating element; (6) the processor may be adapted to output control signals to control the selectively depositing of powder for each of the at least some substrate layers, respectively, in accordance with digital data that specifies different slices, respectively, of the 3D object; and (7) the apparatus may further comprise a container, the container being configured for containing a liquid, which liquid includes a solvent or degrading material that is used for removing material from the at least some negative regions.

This invention may comprise apparatus for fabricating a 3D object, which object comprises a stack of substrate layers that have been infiltrated by a hardened material, the apparatus comprising, in combination: (a) an applicator, the applicator being configured for positioning powder on the layers; and (b) means for transforming the powder into a substance that flows and then hardens into the hardened material, which hardened material binds the layers together and is disposed in a spatial pattern that infiltrates at least one positive region in a set of the layers and does not infiltrate at least one negative region in the set; wherein the substrate layers have at least one material property that is different than any material property of the hardened substance.

This invention may comprise an article of manufacture comprising a plurality of layers that are infiltrated by and bound together by a hardened material, wherein the hardened material comprises either a thermoplastic or thermosettable plastic and exhibits a set of one or more characteristics, which set is sufficient for distinguishing the hardened material as having formed as a result of powder positioned on the layers, respectively, at least partially softening and then hardening. Furthermore: (1) the set of characteristics may comprise a pattern resulting from at least some grains of powder not completely softening; (2) the set of characteristics may comprise a pattern resulting from a first grain of powder flowing, after at least partially softening, more viscously than another grain of powder flows, after at least partially melting, or from part of the first grain flowing more viscously, after at least partially softening, than another part of the first grain flows, after partially softening; (3) the set of characteristics may comprise a crystalline or amorphous structure resulting from incomplete or nonhomogeneous melting of grains of powder; (4) the substrate layers may be woven; (5) the substrate layers may be woven and fibrous; (7) the substrate layers may be non-woven; and (8) the article may include more than one hardened material, each of which has a different shade or color.

This invention may be implemented as an article of manufacture comprising a stack of substrate layers that are infiltrated by a hardened material, wherein an exterior surface of the hardened material has a spatial resolution of 60 or more dots per centimeter in at least one dimension, and wherein the hardened material comprises a thermoplastic, which thermoplastic has an viscosity of 50 or more centipoise at 50 degrees centigrade above the thermoplastic's melting temperature.

This invention may be implemented as an article of manufacture comprising a plurality of substrate layers that are infiltrated by and bound together by a hardened material, wherein an exterior surface of the hardened material has a spatial resolution of 170 or less microns in at least one dimension, and wherein the hardened material comprises a thermoplastic, which thermoplastic has a melt flow rate of at least 70 grams/10 minutes.

This invention may be implemented as a process for fabricating a 3D object, which process comprises, in combination: (a) depositing thermosettable or thermoplastic powder on a second layer of substrate, in a pattern, for each substrate layer, respectively, defined by a digital description of a slice or section of a 3D object, (b) positioning the second layer of the substrate adjacent to a first layer of substrate so that edges of the first and second substrate layers are aligned and so that powder that was deposited on the second layer is between the first and second layers, (c) repeating step a with respect to a third layer of substrate, (d) positioning the third layer substrate adjacent to the second layer so that edges of the second and third layers are aligned and so that powder that was deposited on the third layer is between the second and third layers, (e) repeating steps (c) and (d), layer by layer, until powder has been selectively deposited on substrate layers corresponding to all of the layers of the 3D object, (f) applying sufficient heat and pressure to at least two of these substrate layers to (1) cause at least a portion of the deposited powder to melt or soften, and (2) cause that melted or softened powder to coat at least a portion of the substrate layers, (g) allowing the melted or softened powder to cool, so that, upon cooling, the resulting thermoplastic or thermoset material binds together at least two substrate layers, which two layers are adjacent to each other, and (h) removing a portion of the substrate layers, which portion is not coated by the resulting thermoplastic or thermoset material. Depending on the particular implementation of this process, each of steps (f), (g) and (h) may occur either once, or more than once, during the process. For example, steps (f), (g) and (h) may occur once per layer, or once every five layers.

This invention may be implemented as a product produced by any of the example process implementations previously described.

This invention may be implemented as an article of manufacture, comprising at least twenty layers of substrate, each layer being bound to at least one adjacent layer by (and at least partially coated by) a material that comprises a thermoplastic or thermosettable polymer. Furthermore, depending on the particular embodiment of this article of manufacture: (1) the substrate layer may be woven, (2) the substrate layer may be woven and fibrous, (3) the substrate layer may be non-woven, (4) the substrate layer may be non-fibrous, (5) at least a portion of the external, macroscopic geometry of the substrate may be polyhedral in shape, (6) the macroscopic exterior of the article of manufacture may include multiple rectilinear faces in different planes, (7) the macroscopic exterior of the article of manufacture may define multiple compound or complex curves, (8) substrate layers of such article may be coated at least in part with a repellant or sizing, (9) different portions of the polymer may have different colors, and (10) the polymer may cover fibers in substrate layers. Each layer can be planar or flat.

This invention may be implemented as apparatus comprising, in combination: (a) at least one applicator for depositing thermoplastic or thermosettable powder on multiple layers of substrate, in a pattern, for each substrate layer, respectively, defined by a digital description of a slice or section of a 3D object, (b) at least one heat source for applying heat to the substrate layers, (c) at least one pressure source for applying pressure to the substrate layers, and (d) one or more computer processors for (I) accepting and processing digital data describing a section or slice of a 3d object, and (II) outputting control signals for controlling the operation of the applicators. The apparatus may further comprise one or more of the following: (1) a container for containing a liquid, which liquid includes a solvent or degrading material that is used for removing excess substrate, the excess substrate being that portion of the substrate that is not coated by thermoplastic or thermoset material after it melts or softens and then cools, (2) a heat source for heating the liquid solvent or degrading material, and (3) one or more actuators for translating one or more of the powder, substrate sheets and the finished or partially finished 3D object. Also, depending on the particular embodiment of this article of manufacture, the one or more computer processors may do one or more of the following: (1) accept and process data from one or more sensors, such as heat or pressure sensors, or sensors for determining whether and to what extent adjacent substrate layers are aligned, (2) control the at least one heat source, (3) control the at least one pressure source, (4) control the one or more actuators, and (5) accept data indicative of input from a human user.

In another aspect, this invention comprises a 3D object fabricated using any of the fabrication techniques described above. For example, such a 3D object may be comprised of composite materials. These composite materials may comprise substrate layers coated by solidified thermoplastic or thermoset polymer.

In exemplary implementations of this invention, multiple "slices" of a desired 3D object may be printed on a single sheet. Slices from multiple sheets may be used to fabricate the desired 3D object In some implementations of this invention, all of the steps are automated.

In some implementations of this invention, multiple "slices" are "printed" on each substrate layer. For example, consider a 3D object that comprises 144 slices. 12 substrate layers may be used, and 12 slices may be printed per substrate layer. In that case, particularly if the entire process is automated, it may be preferable to print, on the first sheet, slices 1, 13, 25, . . . 133, on the next sheet, slices 2, 14, 26, . . . 134, and so on. That way, for example, the upper right slice on sheets 1 to 12 may comprise a signature of slices 1 to 12; an upper middle slice on sheets 1 to 12 may comprise a signature of slices 13 to 24, and so on. In this example, the 144 slices may be cut and stacked initially into 12 signatures, and the 12 signatures may then be stacked together in order (e.g., on registration posts in a compressive device).

In some implementations of this invention, no powder is used. A thermosetting liquid or a thermoplastic liquid may be selectively applied to a carbon fiber substrate. The liquid penetrates or coats a region of the carbon fiber substrate. When the liquid later cures or hardens in that region, it produces an extremely stiff carbon fiber composite material. This also acts to bond the layers together and pressure may be used to create a better bond and also to compress the substrate. In a region of the substrate where no liquid is applied (an excess region), the carbon fiber remains friable. The excess region is removed by abrasive blasting. In implementations in which no powder is used, the liquid that is applied may comprise, for example, but is not limited to, uncured epoxy resin, uncured acrylic resin, or UV curable resin. For example, low melting point, low viscosity polyethylene may be used with inkjet heads.

In some implementations of this invention, cut up carbon fiber is used. The cut up carbon fiber may be saturated, coated or infiltrated by a liquid thermosetting polymer or liquid thermoplastic. For example, the liquid may comprise an epoxy resin or acrylic resin. In either case, the resin (or other liquid) can penetrate or coat the cut up carbon fiber fabric, and then cure.

In some implementations, different materials may be used in different layers. For example, in an illustrative implementation, some of the layers may comprise carbon fiber and other layers may comprise other materials, such as polyester. In other illustrative implementations, fibers may be oriented in different directions in different layers, or different thermosetting or thermoplastic materials may be selectively applied in different substrate layers.

A wide variety of registration techniques may be used in this invention. For example, registration holes and posts may be employed for registration. For example, each carbon fiber substrate layer may be cut so that it has four registration holes, one hole on each corner. This can be done with a laser cutter. Or, for example, a rim for each registration hole may be printed, and then a hole in the middle of the rim may be poked out or otherwise removed. After being printed, the carbon fiber substrate layer may be placed on a set of four registration pins, so that the four registration pins penetrate the four registration holes.

Alternatively, for example, self-alignment may be employed. If an applicator (e.g., inkjet printer) is configured to always print within the exact same region, this fact can be exploited to achieve self-alignment. For example, a bottom substrate layer may be held firmly in place on a flatbed printer. Thermoplastic or thermosetting polymer may be selectively applied to the layer by an applicator (e.g., an inkjet cartridge). Another substrate layer may be added. Then the thermoplastic or thermosetting polymer (which was applied to the bottom layer) may be heated and then cooled (or pressed or mixed with a curing agent or other otherwise cured). A hardened or cured material then results, which fuses the first and second layers. This process may be repeated, layer by layer. In this example, the substrate layers are self-aligned, because the printer always prints within the exact same region and the bottom layer is held firmly in place.

The order in which steps occur may vary. For example, heat or pressure or both may be applied once for each layer, for at least most of the layers. Alternatively, for example, heat or pressure or both may be applied less frequently, such as only once every t layers, where t is an integer greater than one, or only once at all, after the thermosetting or thermoplastic material is selectively applied to each of the substrate layers and all of the substrate layers have been positioned in a stack.

In some example implementations, liquid may be selectively applied for just one "slice" of the 3D object, then that "slice" may be flooded with powder, then the excess powder for that slice may be removed, and then the process may be repeated for the next step, and so on, layer by layer. Alternatively, for example, liquid may be selectively applied to print a group of "slices" on a single sheet of the 3D object. Then the whole group of slices on that single sheet may be flooded with powder, then the excess powder for that group of slices may be removed, and then the process may be repeated for the next group of slices, and so on, group by group.

In some implementations of this invention, a powder may comprise a mixture that includes microencapsulated thermosetting resin and a powder based hardener. As discussed previously, the powder mixture may be selectively applied, including by first selectively applying fluid to a substrate, and then flooding the substrate with powder so that powder adheres to the liquid, and then removing the excess loose powder. The powder mixture may then be crushed, so that the microcapsules burst or leak, the thermosetting polymer and curing agent mix, and the thermosetting polymer is cured. The cured material may infiltrate or coat a portion of each substrate layer, respectively, and the excess portion of each substrate layer may be removed, e.g. by abrasive blasting.

This invention may also be implemented as a 3D composite object fabricated by a 3D printer. Such a 3D object may comprise layers of carbon fiber substrate that were fused together by thermoplastic or a thermoset. In some cases, the hardened material in the 3D object may have characteristics indicative of the fact that the thermoplastic plastic was in powder form immediately before melting, including partial melting. In some cases, the hardened material in the 3D object may have characteristics indicative of the fact that pressure was applied to burst a powder mixture that includes microencapsulated thermosetting polymer and power based hardener. In some cases, the carbon fiber may be arranged in the 3D object in a pattern indicative of the fact that, before the thermoset or thermoplastic hardened, the carbon fibers were cut up, were loose, or otherwise did not comprise entire, integral sheets of carbon fiber. In some cases, some substrate layers in the 3D object may comprise carbon fiber and other substrate layers in the 3D object may comprise another material. In some cases, the orientation or weave characteristics of the carbon fiber substrate in the 3D object may vary from layer to layer. In some cases, the hardened thermoplastic or thermoset material may contain chemicals or other characteristics indicative of the fact that the material, before it hardened, was ejected by an inkjet cartridge or inkjet head, or by some other particular type of applicator.

In exemplary implementations, the hardware of this invention may include any one or more of the following components, together or in combination: (1) applicators, including applicators for selectively applying liquid to substrate layers, (2) positioning apparatus, including positioning apparatus for rastering or otherwise moving an applicator when selectively depositing liquid or powder, (3) vessels, containers, bins, pipes, hoses or other channels for storing or moving materials used in fabricating a 3D object, including vessels, containers, bins, pipes, hoses or other channels for storing or moving any thermoplastic, thermosetting polymer, curing agent, or other raw or intermediate material used in fabrication, and including vessels, containers, bins, pipes, hoses or other channels for storing or moving any fluids, including compressed gas, used in abrasive blasting or any other manufacturing step, (4) substrate manipulators, including substrate manipulators for shaking, rotating, translating, vibrating or vacuuming substrate layers, (5) heating or compressive apparatus, including heating or compressive apparatus for heating or compressing stacks of one or more substrate layers, and including heating elements, (6) subtractive manufacturing apparatus, including abrasive blasting apparatus, bristle blasting apparatus, abrasion apparatus, rotary brushes, wire brushes, sandpaper, emery paper, belts, sanders, files, saws, drills, burrs, awls, scrapers, scalers, or curettes, and further including any of the foregoing configured for removing excess regions of substrate or removing raw materials or intermediate materials employed in fabrication, including abrasive blasting apparatus for abrading excess regions of substrate layers, (7) actuators (including motors, engines transmissions, power trains, pumps, fans or robotics) for actuating motion of any the hardware described above or for actuating motion of any material (including powder, or any material in any phase, including solid, liquid, gas) used in fabricating a 3D object, (8) additive manufacturing apparatus of any kind, (9) electronic devices, including electronic memory devices, and (10) processors, including processors for generating CAD models of target 3D objects, producing slices and bitmaps, outputting control signals to control the other hardware described above, receiving signals indicative of human input, outputting signals for controlling output of information in human perceivable form, and reading data from, and writing data to, one or more electronic memory devices.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention.

What is claimed is:

1. A three-dimensional article of manufacture comprising a plurality of substrate layers that are infiltrated or coated by, and bound together by, a hardened material, such that the hardened material has a material composition that is different from the material composition of any of the plurality of substrate layers, wherein all of the plurality of substrate layers have a substantially identical material composition and each substrate layer is a sheet-like structure that has a material composition comprising fibers held together by binder consisting only of sodium silicate.

2. The article of manufacture of claim 1, wherein the substrate layer material composition includes fibers selected from the group consisting of carbon fibers, ceramic fibers, polymer fibers, glass fibers, and metal fibers.

3. The article of manufacture of claim 1, wherein the substrate material is non-woven.

4. The article of manufacture of claim 3, wherein the substrate layer material composition includes fibers selected from the group consisting of carbon fibers, ceramic fibers, polymer fibers, glass fibers, and metal fibers.

5. The article of manufacture of claim 1, wherein the substrate material is woven.

6. The article of manufacture of claim 5, wherein the substrate layer material composition includes fibers selected from the group consisting of carbon fibers, ceramic fibers, polymer fibers, glass fibers, and metal fibers.

7. The article of manufacture of claim 1, wherein the hardened material is formed by heating at least one engineered powder.

8. The article of manufacture of claim 7, wherein the engineered powder comprises at least one emulsion aggregation powder.

9. The article of manufacture of claim 7, wherein the engineered powder comprises at least one chemically-produced toner powder.

10. The article of manufacture of claim 1, wherein the hardened material exhibits a set of one or more characteristics, which set is sufficient for distinguishing the hardened material as having formed as a result of the powder having been positioned on the substrate layers and then being at least partially softened followed by hardening.

11. An article of manufacture comprising a substrate layer that is a sheet-like structure having a material composition comprising fibers held together by binder consisting only of sodium silicate.

12. The article of manufacture of claim 11, wherein the substrate layer material composition includes fibers selected from the group consisting of carbon fibers, ceramic fibers, polymer fibers, glass fibers, and metal fibers.

13. The article of manufacture of claim 11, wherein the substrate material is non-woven.

14. The article of manufacture of claim 13, wherein the substrate layer material composition includes fibers selected from the group consisting of carbon fibers, ceramic fibers, polymer fibers, glass fibers, and metal fibers.

15. The article of manufacture of claim 11, wherein the substrate material is woven.

16. The article of manufacture of claim 15, wherein the fibers are selected from the group consisting of carbon fibers, ceramic fibers, polymer fibers, glass fibers, and metal fibers.

17. An article of manufacture comprising a non-woven substrate comprising fibers held together by binder consisting only of sodium silicate.

18. The article of manufacture of claim 17, wherein the fibers are selected from the group consisting of carbon fibers, ceramic fibers, polymer fibers, glass fibers, and metal fibers.

19. The article of manufacture of claim 17, wherein the substrate is a sheet-like structure.

* * * * *